US012535708B2

(12) United States Patent
Nguyen et al.

(10) Patent No.: US 12,535,708 B2
(45) Date of Patent: Jan. 27, 2026

(54) OPTICAL SYSTEMS HAVING POLARIZATION RECYCLING STRUCTURES

(71) Applicant: Apple Inc., Cupertino, CA (US)

(72) Inventors: Thanh Son Nguyen, Campbell, CA (US); Xiaokai Li, Mountain View, CA (US); Yuan Chen, Campbell, CA (US); Zhibing Ge, Los Altos, CA (US); Jian Gao, Fremont, CA (US)

( * ) Notice: Subject to any disclaimer, the term of this patent is extended or adjusted under 35 U.S.C. 154(b) by 414 days.

(21) Appl. No.: 18/169,339

(22) Filed: Feb. 15, 2023

(65) Prior Publication Data

US 2023/0324740 A1 Oct. 12, 2023

Related U.S. Application Data

(63) Continuation of application No. PCT/US2021/047620, filed on Aug. 25, 2021.
(Continued)

(51) Int. Cl.
*G02F 1/13357* (2006.01)
*G02B 27/01* (2006.01)
(Continued)

(52) U.S. Cl.
CPC ..... *G02F 1/13362* (2013.01); *G02B 27/0172* (2013.01); *G02F 1/133603* (2013.01);
(Continued)

(58) Field of Classification Search
None
See application file for complete search history.

(56) References Cited

U.S. PATENT DOCUMENTS

| 5,828,488 A | 10/1998 | Ouderkirk et al. |
| 2004/0218390 A1* | 11/2004 | Holman ............ G02F 1/133605 |
| | | 257/E33.072 |

(Continued)

FOREIGN PATENT DOCUMENTS

| CN | 103869590 A | 6/2014 |
| CN | 110543052 A | 12/2019 |
| WO | WO-2013016163 A2 * | 1/2013 ........... G03B 21/208 |

OTHER PUBLICATIONS

Jaehee Cho et al., GaInN-based light emitting diodes embedded with wire grid polarizers, Japanese Journal of Applied Physics 54, Dec. 22, 2014, 02BB02, The Japan Society of Applied Physics.
(Continued)

*Primary Examiner* — Shan Liu
(74) *Attorney, Agent, or Firm* — Treyz Law Group, P.C.; Michael H. Lyons; Jinie M. Guihan

(57) ABSTRACT

A display may include illumination optics, a ferroelectric liquid crystal on silicon (fLCOS) panel, and a waveguide. The illumination optics may produce linear polarized illumination light that is modulated by the fLCOS panel to produce image light. The illumination optics may include light emitters that emit respective wavelengths of the illumination light. The illumination optics may include an X-plate that outputs the illumination light by combining the light emitted by the light emitters. Polarization recycling structures may be optically interposed between each of the light emitters and the X-plate. The polarization recycling structures may include a reflective polarizer. If desired, the polarizing recycling structures may also include a quarter waveplate. The polarization recycling structures may serve to minimize the amount of light lost in producing linearly polarized illumination light for the fLCOS display panel, thereby maximizing the optical efficiency of the display.

14 Claims, 28 Drawing Sheets

Related U.S. Application Data

(60) Provisional application No. 63/071,996, filed on Aug. 28, 2020.

(51) Int. Cl.
*G02F 1/1335* (2006.01)
*G02F 1/1362* (2006.01)

(52) U.S. Cl.
CPC .. *G02F 1/133605* (2013.01); *G02F 1/133607* (2021.01); *G02F 1/133621* (2013.01); *G02F 1/136281* (2021.01); *G02B 2027/0112* (2013.01); *G02F 2203/07* (2013.01)

(56) References Cited

U.S. PATENT DOCUMENTS

| | | | |
|---|---|---|---|
| 2006/0203352 A1* | 9/2006 | Pashley | G02B 27/102 359/634 |
| 2006/0244920 A1* | 11/2006 | Kawaai | H04N 9/3167 353/20 |
| 2007/0024825 A1* | 2/2007 | Stephanes Maria De Vaan | H04N 9/3167 348/E9.027 |
| 2007/0030456 A1* | 2/2007 | Duncan | G02B 27/283 353/20 |
| 2007/0216617 A1 | 9/2007 | Handschy et al. | |
| 2008/0174581 A1 | 7/2008 | Matsumoto et al. | |
| 2010/0072481 A1 | 3/2010 | Xiang et al. | |
| 2014/0071539 A1* | 3/2014 | Gao | G02B 27/0172 359/737 |
| 2017/0285384 A1* | 10/2017 | Yata | G02F 1/13363 |
| 2019/0033581 A1* | 1/2019 | Li | G02B 27/0172 |
| 2020/0249536 A1 | 8/2020 | Fan | |
| 2020/0300442 A1* | 9/2020 | Xiao | G02B 27/30 |
| 2023/0118416 A1* | 4/2023 | Hirata | B60K 35/10 359/630 |

OTHER PUBLICATIONS

Vergaz R. et al., "Spectral Response in V-Shape Chiral Smectic Liquid Crystal Devices", Molecular Crystals and Liquid Crystals, vol. 410, No. 1, Jan. 18, 2004, pp. 457-465, Taylor & Francis Inc.

* cited by examiner

OPTICAL SYSTEMS HAVING POLARIZATION RECYCLING STRUCTURES

This application is a continuation of international patent application No. PCT/US2021/047620, filed Aug. 25, 2021, which claims priority to U.S. provisional patent application No. 63/071,996, filed Aug. 28, 2020, which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module and a waveguide. The display module may include a spatial light modulator such as a ferroelectric liquid crystal on silicon (fLCOS) display panel and illumination optics. The illumination optics may include light sources such as light emitting diodes (LEDs) that produce illumination light. The illumination light may be provided with a linear polarization and may be transmitted to the fLCOS display panel. The fLCOS display panel may modulate image data (e.g., image frames) onto the illumination light to produce image light. The waveguide may direct the image light towards an eye box.

The illumination optics may include at least first and second light emitters that emit respective wavelengths of the illumination light. The illumination optics may include an X-plate that outputs the illumination light by combining the light emitted by the first and second light emitters. Polarization recycling structures may be optically interposed between each of the light emitters and the X-plate. The polarization recycling structures for a given one of the light emitters may include a reflective polarizer. If desired, the polarizing recycling structures may also include a quarter waveplate optically interposed between the reflective polarizer and the light emitter. The polarization recycling structures may serve to minimize the amount of light lost in producing linearly polarized illumination light for the fLCOS display panel, thereby maximizing the optical efficiency of the display. Polarizing the illumination light prior to the X-plate may also optimize the spectral performance of the illumination light, for example.

DETAILED DESCRIPTION

Figure 1:
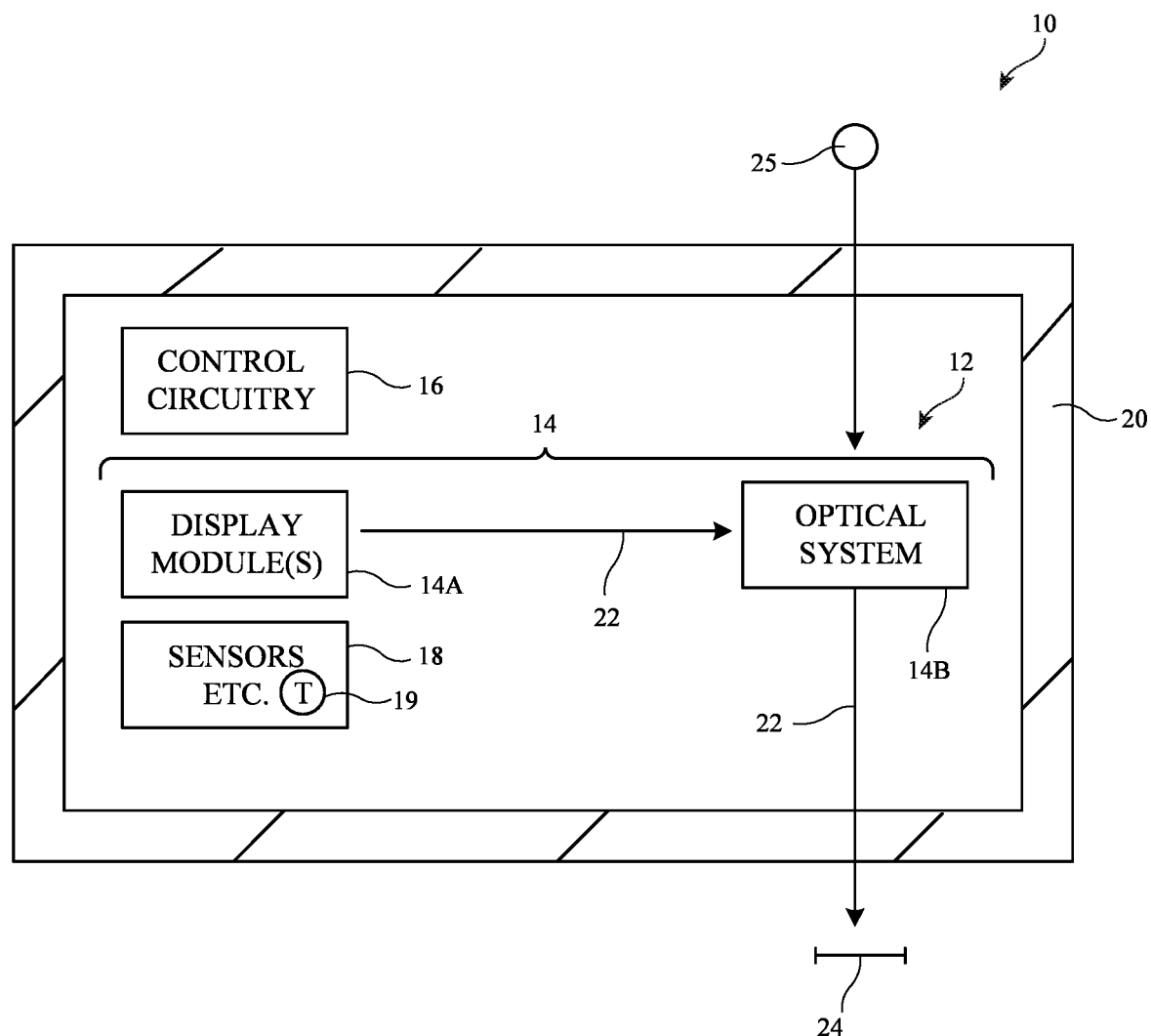
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, the sensors in components 18 may include one or more temperature (T) sensors 19. Temperature sensor(s) 19 may gather temperature sensor data (e.g., temperature values) from one or more locations in system 10. If desired, control circuitry 16 may use the gathered temperature sensor data in controlling the operation of display module 14A.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays (e.g., ferroelectric liquid crystal on silicon (fLCOS) displays), digital-micromirror device (DMD) displays, or other spatial light modulators), emissive displays (e.g., micro-light-emitting diode (uLED) displays, organic light-emitting diode (OLED) displays, laser-based displays, etc.), or displays of other types. An arrangement in which display module 14A includes an fLCOS display is sometimes described herein as an example. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
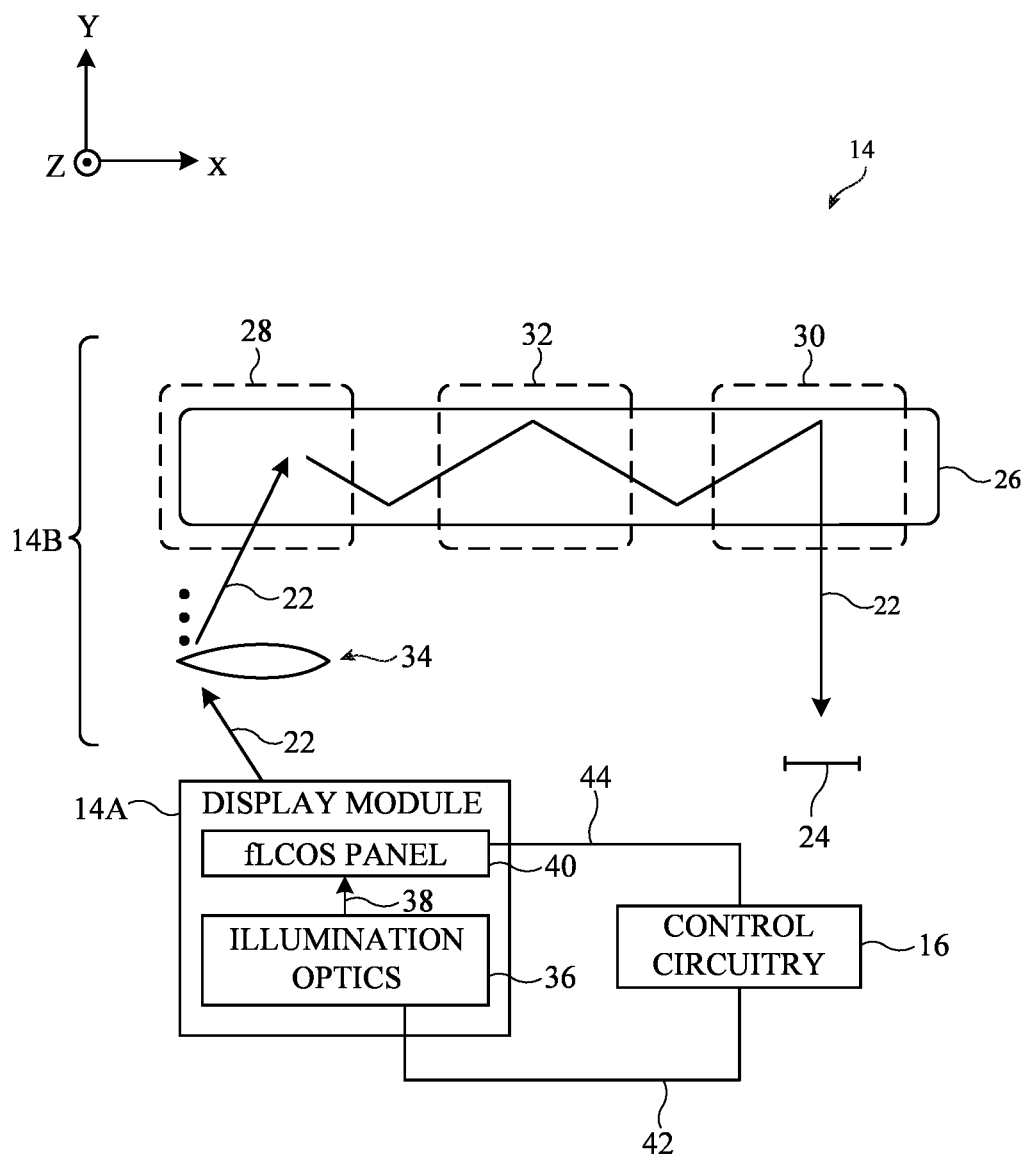
FIG. 2 is a top view of an illustrative optical system for a display having a display module that provides image light to a waveguide in accordance with some embodiments.

FIG. 2 is a top view of an illustrative display 14 that may be used in system 10 of FIG. 1. As shown in FIG. 2, display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 is shown external to display module 14A in FIG. 2 for the sake of clarity. In general, collimating lens 34 may be formed entirely external to display module 14A, entirely within display module 14A, or one or more lens elements in collimating lens 34 may be formed in display module 14A (e.g., collimating lens 34 may include both lens elements that are internal to display module 14A and lens elements that are external to display module 14A). Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, control circuitry 16 may control display module 14A to generate image light 22 associated with image content (data) to be displayed to (at) eye box 24. In the example of FIG. 2, display module 14A includes illumination optics 36 and a spatial light modulator such as fLCOS display panel 40 (sometimes referred to herein simply as fLCOS panel 40).

Control circuitry 16 may be coupled to illumination optics 36 over control path(s) 42. Control circuitry 16 may be coupled to fLCOS panel 40 over control path(s) 44. Control circuitry 16 may provide control signals to illumination optics 36 over control path(s) 42 that control illumination optics 36 to produce illumination light 38 (sometimes referred to herein as illumination 38). The control signals may, for example, control illumination optics 36 to produce illumination light 38 using a corresponding illumination sequence. The illumination sequence may involve sequentially illuminating light sources of different colors in illumination optics 36. In one suitable arrangement that is sometimes described herein as an example, the illumination sequence may be a green-heavy illumination sequence.

Illumination optics 36 may illuminate fLCOS display panel 40 using illumination light 38. Control circuitry 16 may provide control signals to fLCOS display panel 40 over control path(s) 44 that control fLCOS display panel 40 to modulate illumination light 38 to produce image light 22. For example, control circuitry 16 may provide image data such as image frames to fLCOS display panel 40. The image light 22 produced by fLCOS display panel 40 may include the image frames identified by the image data. Control circuitry 16 may, for example, control fLCOS display panel 40 to provide fLCOS drive voltage waveforms to electrodes in the display panel. The fLCOS drive voltage waveforms may be overdriven or underdriven to optimize the performance of display module 14A, if desired. While an arrangement in which display module 14A includes fLCOS display panel 40 is described herein as an example, in general, display module 14A may include any other desired type of reflective display panel (e.g., a DMD panel), an emissive display panel, etc.

Image light 22 may be collimated using collimating lens 34 (sometimes referred to herein as collimating optics 34). Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26 (e.g., at an angle such that the image light can propagate down waveguide 26 via total internal reflection), whereas output coupler 30 may be configured to couple image light 22 from within waveguide 26 to the exterior of waveguide 26 and towards eye box 24. Input coupler 28 may include a reflective or transmissive input coupling prism if desired. As an example, display module(s) 14A may emit image light 22 in the +Y direction towards optical system 14B.

When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example. In this way, display module 14A may provide image light 22 to eye box 24 over an optical path that extends from display module 14A, through collimating lens 34, input coupler 28, cross coupler 32, and output coupler 30.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

Figure 3:
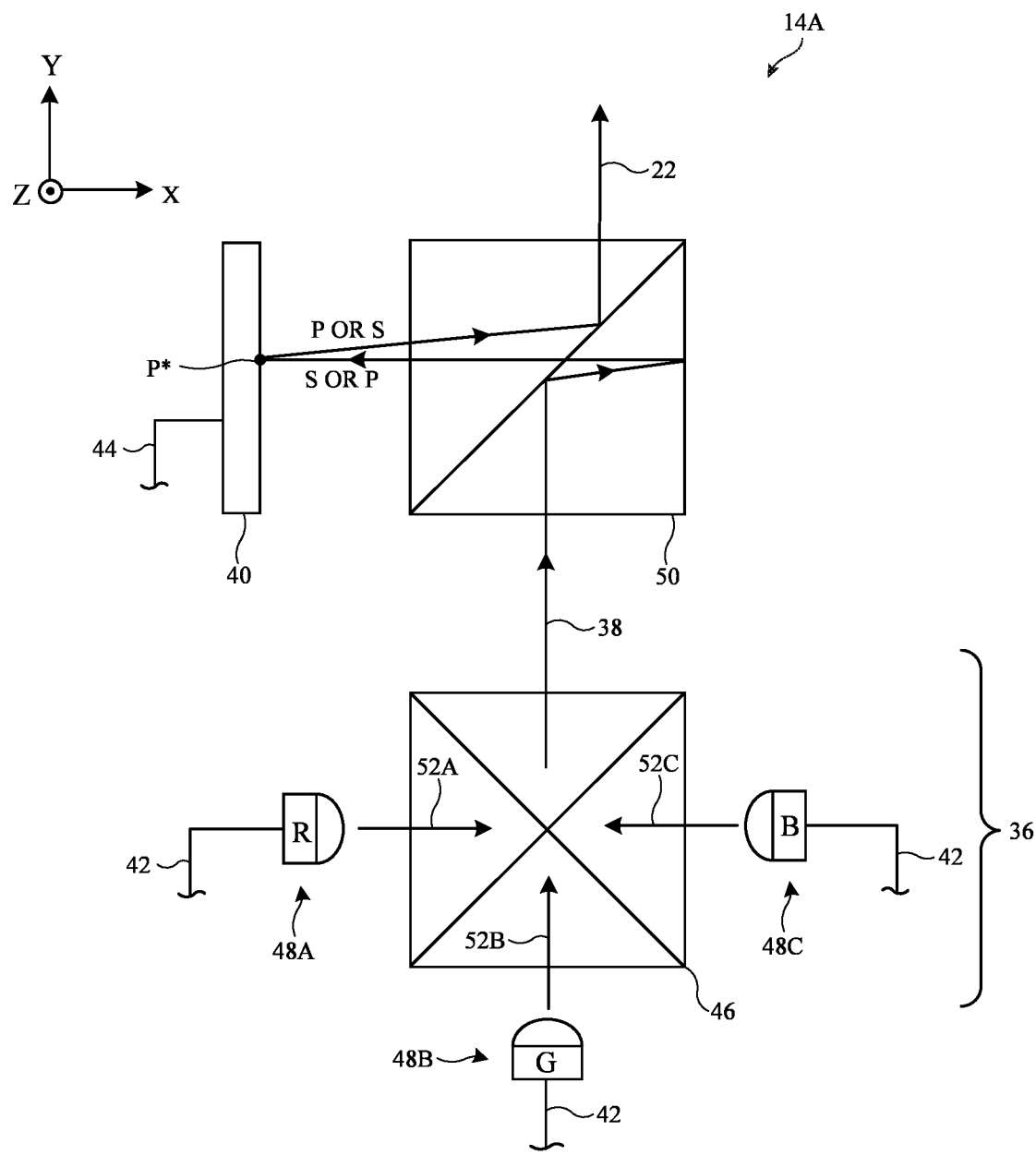
FIG. 3 is a top view of an illustrative display module having a ferroelectric liquid crystal on silicon (fLCOS) display panel in accordance with some embodiments.

FIG. 3 is a top view of display module 14A. As shown in FIG. 3, display module 14A may include illumination optics 36 that provide illumination light 38 to fLCOS display panel 40. fLCOS display panel 40 may modulate images onto illumination light 38 to produce image light 22.

Illumination optics 36 may include one or more light sources 48 such as a first light source 48A, a second light source 48B, and a third light source 48C. Light sources 48 may emit illumination light 52. Prism 46 (e.g., an X-plate) in illumination optics 36 may combine the illumination light 52 emitted by each of the light sources 48 to produce the illumination light 38 that is provided to fLCOS display panel 40. In one suitable arrangement that is sometimes described herein as an example, first light source 48A emits red illumination light 52A (e.g., light source 48A may be a red (R) light source), second light source 48B emits green illumination light 52B (e.g., light source 48B may be a green (G) light source), and third light source 48C emits blue illumination light 52C (e.g., light source 48C may be a blue (B) light source). This is merely illustrative. In general, light sources 48A, 48B, and 48C may respectively emit light in any desired wavelength bands (e.g., visible wavelengths, infrared wavelengths, near-infrared wavelengths, etc.).

An arrangement in which illumination optics 36 includes only one light source 48A, one light source 48B, and one light source 48C is sometimes described herein as an example. This is merely illustrative. If desired, illumination optics 36 may include any desired number of light sources 48A (e.g., an array of light sources 48A), any desired number of light sources 48B (e.g., an array of light sources 48B), and any desired number of light sources 48C (e.g., an array of light sources 48C). Light sources 48A, 48B, and 48C may include LEDs, OLEDs, uLEDs, lasers, or any other desired light sources. An arrangement in which light sources 48A, 48B, and 48C are LED light sources is described herein as an example. Light sources 48A, 48B, and 48C may be controlled (e.g., separately/independently controlled) by control signals received from control circuitry 16 (FIG. 2) over control path(s) 42. The control signals may, for example, control light sources 48A, 48B, and 48C to emit illumination light 52 using a corresponding illumination sequence in which one or more of the light sources emits illumination light at any given time and the active light sources cycle over time.

Illumination light 38 may include the illumination light 52A, 52B, and 52C emitted by light sources 48A, 48B, and 48C, respectively. Prism 50 may provide illumination light 38 to fLCOS display panel 40. If desired, additional optical components such as lens elements, microlenses, polarizers, prisms, beam splitters, and/or diffusers (not shown in FIG. 3 for the sake of clarity) may be optically interposed between light sources 48A-C and fLCOS display panel 40 to help direct illumination light 38 from illumination optics 36 to fLCOS display panel 40.

Prism 50 may direct illumination light 38 onto fLCOS display panel 40 (e.g., onto different pixels P* on fLCOS display panel 40). Control circuitry 16 may provide control signals to fLCOS display panel 40 over control path(s) 44 that control fLCOS display panel 40 to selectively reflect illumination light 38 at each pixel location to produce image light 22 (e.g., image light having an image as modulated onto the illumination light by fLCOS display panel 40). As an example, the control signals may drive fLCOS drive voltage waveforms onto the pixels of fLCOS display panel 40. Prism 50 may direct image light 22 towards collimating lens 34 of FIG. 2.

In general, fLCOS display panel 40 operates on illumination light of a single linear polarization. Polarizing structures interposed on the optical path between light sources 48A-C and fLCOS display panel 40 may convert unpolarized illumination light into linearly polarized illumination light (e.g., s-polarized light or p-polarized illumination light). The polarizing structures may, for example, be optically interposed between prism 50 and fLCOS display panel 40, between prism 46 and prism 50, between light sources 48A-C and prism 46, within light sources 48A-C, or elsewhere.

If a given pixel P* in fLCOS display panel 40 is turned on, the corresponding illumination light may be converted between linear polarizations by that pixel of the display panel. For example, if s-polarized illumination light 38 is incident upon a given pixel P*, fLCOS display panel 40 may reflect the s-polarized illumination light 38 to produce corresponding image light 22 that is p-polarized when pixel P* is turned on. Similarly, if p-polarized illumination light 38 is incident upon pixel P*, fLCOS display panel 40 may reflect the s-polarized illumination light 38 to produce corresponding image light 22 that is s-polarized when pixel P* is turned on. If pixel P* is turned off, the pixel does not convert the polarization of the illumination light, which prevents the illumination light from reflecting out of fLCOS display panel 40 as image light 22.

Figure 4:
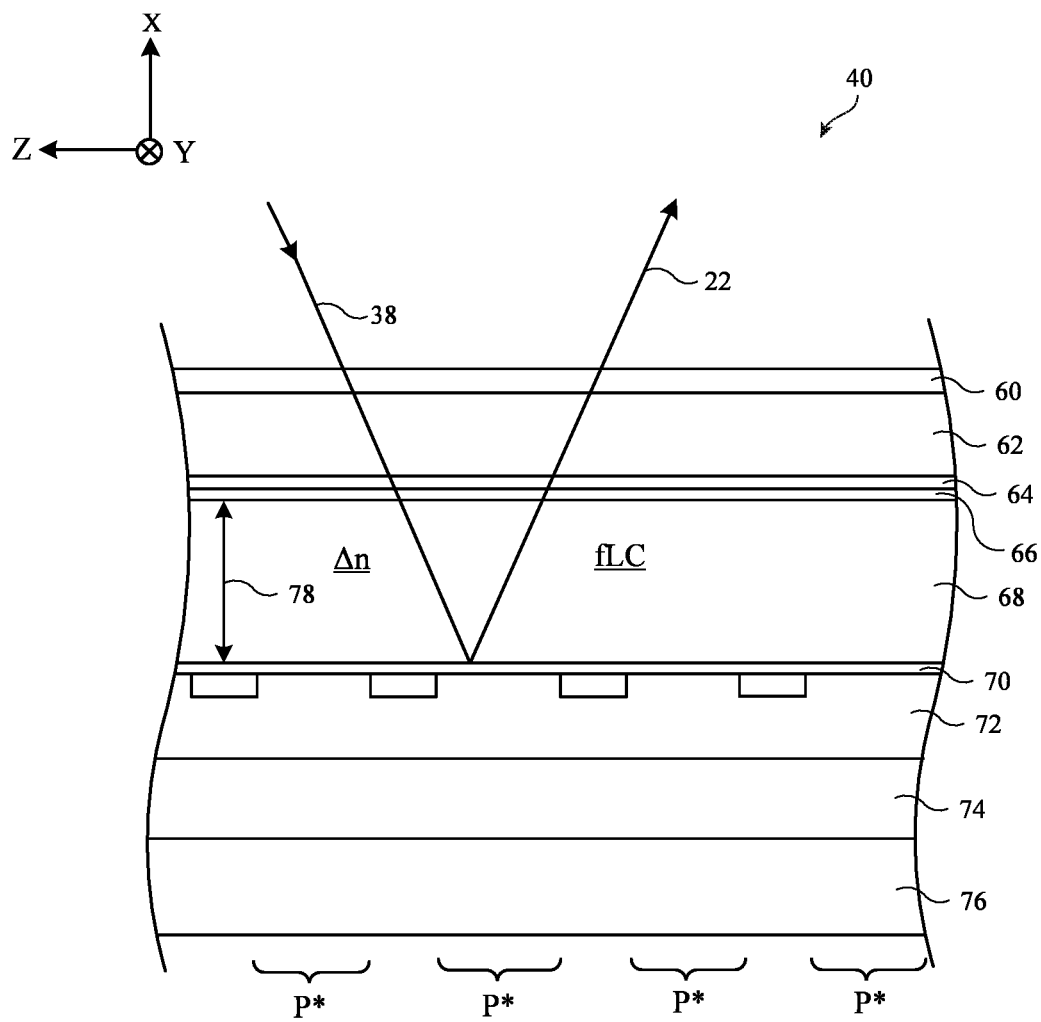
FIG. 4 is a cross-sectional side view of an illustrative fLCOS display panel in accordance with some embodiments.

FIG. 4 is a cross-sectional side view of fLCOS display panel 40. Four pixels P* in fLCOS display panel 40 are illustrated in FIG. 4 for the sake of clarity. In general, fLCOS display panel 40 may include any desired number of pixels P* arranged in any desired pattern (e.g., any desired number of rows and columns).

As shown in FIG. 4, fLCOS display panel 40 may include a flexible printed circuit 74 (sometimes referred to herein as driver flex 74). Driver flex 74 may be layered onto substrate 76. This is merely illustrative and, if desired, substrate 76 may be omitted. Driver flex 74 may carry control path(s) 44 (FIG. 2) for driving the pixels P* in fLCOS display panel 40, for example.

A backplane such as backplane 72 may be layered over driver flex 74. Backplane 72 may serve as a reflective surface for reflecting incident illumination light 38 as corresponding image light 22. In some scenarios, backplane 72 is an aluminum backplane made from aluminum metal. However, in practice, forming backplane 72 from aluminum may limit the overall reflective performance of fLCOS display panel 40, thereby limiting the overall optical performance and efficiency of display module 14A.

In order to increase the reflectivity of backplane 72, backplane 72 may be formed from silver or a silver alloy (e.g., backplane 72 may be a silver backplane or a silver alloy backplane). Forming backplane 72 from silver may, for example, increase the amount of reflection in media for fLCOS display panel 40 from around 86% (in scenarios where backplane 72 is formed from aluminum) to as high as around 97%. Forming backplane 72 from silver alloy may optimize the stability of the system, for example. In another suitable arrangement, backplane 72 may be a dielectric mirror backplane. Forming backplane 72 from a dielectric mirror may also increase the reflectance of fLCOS display panel 40 relative to scenarios where an aluminum backplane is used.

An alignment layer such as polyimide alignment layer 70 may be layered over backplane 72. A ferroelectric liquid crystal (fLC) layer such as fLC layer 68 may be layered over polyimide alignment layer 70. An additional polyimide alignment layer 66 may be layered over fLC layer 68. Polyimide alignment layers 70 and 66 may, for example, serve to align the fLC molecules in fLC layer 68 at the upper and lower surfaces of fLC layer 68.

An electrode layer such as electrode layer 64 may be layered over polyimide alignment layer 66. Electrode layer 64 may include indium tin oxide (ITO) traces or index-matching indium tin oxide (IMITO) traces, as examples. Electrode layer 64 may, for example, receive fLCOS drive voltage waveforms that control the state of each pixel P* in fLCOS display panel 40 (e.g., to reflect incident illumination light 38 of a first polarization as corresponding image light 22 of a second polarization when the pixel is turned on and to reflect illumination light 38 with the first polarization when the pixel is turned off, thereby preventing the reflected light from passing to waveguide 26 of FIG. 2 as image light 22).

A cover layer such as cover glass 62 may be layered over electrode layer 64 (e.g., electrode layer 64 may be patterned onto the lower surface of cover glass 62). An optional anti-reflective coating 60 may be layered over cover glass 62 to minimize reflections at the upper surface of cover glass 62. As shown in FIG. 4, illumination light 38 may pass through anti-reflective coating 60, cover glass 62, electrode layer 64, polyimide alignment layer 66 and fLC layer 68. Illumination light 38 may reflect off of backplane 72 (e.g., as image light 22 when the corresponding pixel P* is turned on). Image light 22 may then pass through fLC layer 68, polyimide alignment layer 66, electrode layer 64, cover glass 62, and anti-reflective coating 60 before passing to waveguide 26 of FIG. 2.

fLC layer 68 may have a corresponding birefringence Δn. fLC layer 68 may have a thickness 78. Thickness 78 may sometimes be referred to herein as cell gap 78. In general, cell gap 78 may be selected to optimize the optical efficiency of fLCOS display panel 40 at a particular wavelength. This may be performed by selecting cell gap 78 to be approximately equal to (e.g., within 5% of) λ/(4Δn), where λ is the vacuum wavelength for which optical efficiency is optimized and "/" is the division operator.

Figure 5:
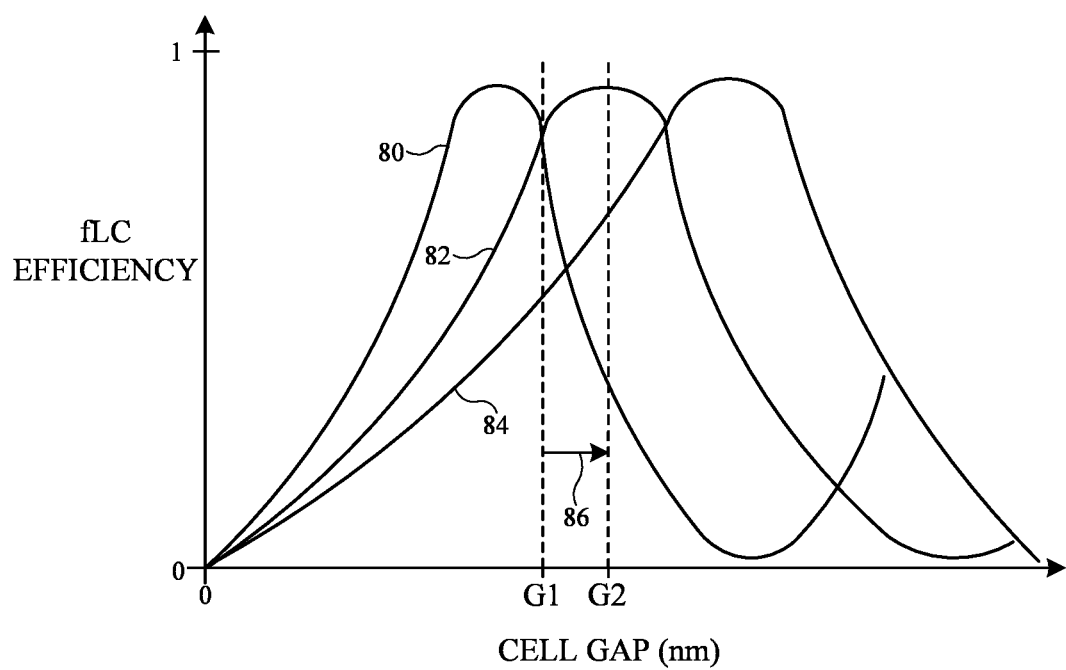
FIG. 5 is a plot of ferroelectric liquid crystal (fLC) efficiency as a function of cell gap for an illustrative fLCOS display panel in accordance with some embodiments.

FIG. 5 is a plot of the optical efficiency of fLC display panel 40 as a function of cell gap 78. As shown in FIG. 5, curve 80 plots the efficiency of fLC display panel 40 at blue wavelengths (e.g., at a blue wavelength such as 450 nm). Curve 82 plots the efficiency of fLC display panel 40 at green wavelengths (e.g., a green wavelength such as 532 nm). Curve 84 plots the efficiency of fLC display panel 40 at red wavelengths (e.g., a red wavelength such as 633 nm).

In some scenarios, cell gap 78 may be selected to have magnitude G1 (e.g., the cell gap corresponding to the intersection of curves 80 and 82). This may serve to optimize the efficiency of fLC display panel 40 for both blue and green wavelengths. However, the optical performance of fLCOS display panel 40 may be further optimized by increasing cell gap 78, as shown by arrow 86, to magnitude G2 (e.g., the cell gap corresponding to the peak of curve 82). By selecting cell gap 78 to have magnitude G2, the optical efficiency of fLC display panel 40 may be optimized for green wavelengths. This may serve to increase the overall optical efficiency of fLCOS display panel 40 in response to illumination light 38 relative to scenarios where cell gap 78 has magnitude G1.

In other words, the optical efficiency of fLC display panel 40 may be optimized when cell gap 78 of FIG. 4 is selected to be equal to $\lambda_G/(4\Delta n)$, where $\lambda_G$ is a vacuum wavelength such as a green wavelength, 526 nm, between 520 nm and 530 nm, between 510 nm and 540 nm, between 500 nm and 565 nm, less than 565 nm, less than 550 nm, less than 540 nm, less than 530 nm, greater than 500 nm, greater than 510 nm, or greater than 520 nm, as examples. Configuring cell gap 78 in this way may increase the magnitude of cell gap 78 from a magnitude G1 of around 620 nm to a magnitude G2 of around 706 nm, as one example. This may serve to increase the optical efficiency of fLC layer 68 and thus fLCOS display panel 40 by as much as 5% relative to scenarios where cell gap 78 has magnitude G1. The example of FIG. 5 is merely illustrative. Curves 80-84 may have other shapes in practice.

In general, the light-emissive portions of light sources 48A-C (FIG. 3) emit unpolarized illumination light. The unpolarized illumination light is converted to a single linear polarization (e.g., s-polarized light or p-polarized light) in order to be reflected by fLCOS display panel 40 as image light 22. However, if care is not taken, converting unpolarized light to light of a single linear polarization can prevent as much as half of the emitted illumination light from being converted into image light 22, thereby limiting the overall optical efficiency of display module 14A. If desired, light sources 48A-C may include polarization recycling structures that increase the amount of emitted illumination light that is converted to image light 22, thereby maximizing the optical efficiency of display module 14A.

Figure 6:
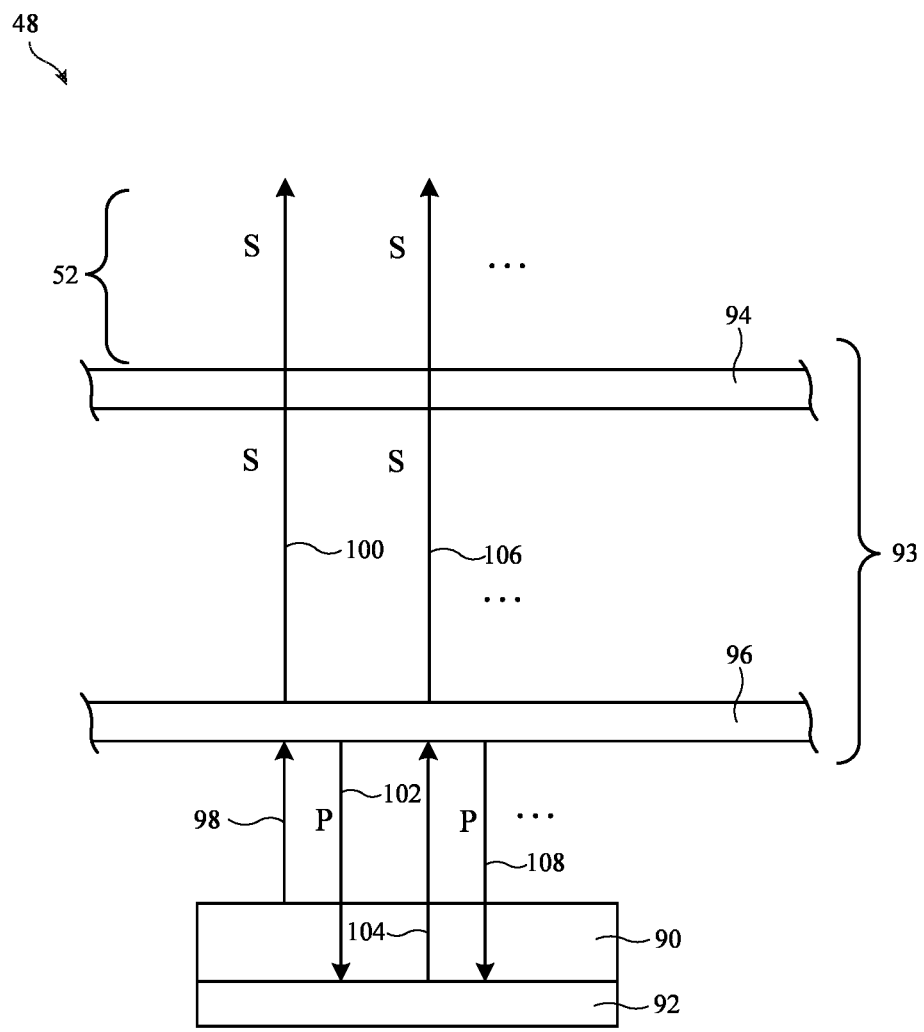
FIG. 6 is a top view of an illustrative light source having polarization recycling structures with a reflective polarizer in accordance with some embodiments.

FIG. 6 is a top view of an illustrative light source 48 having polarization recycling structures. Light source 48 of FIG. 6 may be a light source such as light source 48A, light source 48B, or light source 48C of FIG. 3, for example. An arrangement in which light source 48 is an LED light source is described herein as an example. This is merely illustrative and, in general, light source 48 may be any desired type of light source.

As shown in FIG. 6, light source 48 may include reflector and contact layer 92. Light source 48 may include an LED die such as LED die 90 layered over reflector and contact layer 92. Light source 48 may also include polarization recycling structures such as polarization recycling structures 93. In the example of FIG. 6, polarization recycling structures 93 include a reflective polarizer such as reflective polarizer 96 overlapping LED die 90 and a polarizer such as polarizer 94 overlapping reflective polarizer 96 (e.g., reflective polarizer 96 may be optically interposed between polarizer 94 and LED die 90). Polarization recycling structures 93 may, for example, be optically interposed between LED die 90 and prism 46 of FIG. 3.

Polarizer 94 may transmit light of a single linear polarization while blocking light of other polarizations. An example in which polarizer 94 transmits s-polarized light while blocking light of other polarizations is described herein as an example. This is merely illustrative and, in another suitable arrangement, polarizer 94 may transmit p-polarized light.

As shown in FIG. 6, when light source 48 is active, LED die 90 may emit unpolarized illumination light, as shown by arrow 98 (e.g., in response to control signals received from control circuitry 16 over control path 42 (s) of FIG. 2). In scenarios where reflective polarizer 96 is omitted, polarizer 94 serves to pass s-polarized light from the illumination light (e.g., as illumination light 52 that is provided to prism 46 of FIG. 3) while blocking other polarizations. This may prevent as much as half of the emitted unpolarized light from passing to prism 46 and thus fLCOS display panel 40 (FIG. 3). Polarization recycling structures 93 may serve to recycle polarizations of light that would otherwise not be transmitted by polarizer 94 until at least some of the recycled light passes through polarizer 94 as illumination light 52, thereby increasing the overall optical efficiency of the display module.

Reflective polarizer 96 may be, for example, a wire grid polarizer (WGP), a reflective polarizer film or coating, a cholesteric liquid crystal (LC) layer, or other structures that transmit light of a first polarization while reflecting light of a second polarization. As shown by arrow 100, reflective polarizer 96 may transmit light of the same polarization that is transmitted by polarizer 94 (e.g., reflective polarizer 96 may transmit s-polarized light). This light may pass through polarizer 94 as a portion of the illumination light 52 that is provided to prism 46 of FIG. 3. At the same time, reflective polarizer 96 may reflect light of other polarizations that are not transmitted by polarizer 94.

For example, as shown by arrow 102, reflective polarizer 96 may reflect p-polarized light from the unpolarized light emitted by LED die 90. The p-polarized light reflected by reflective polarizer 96 may reflect off of reflector and contact layer 92, as shown by arrow 104. Some of the p-polarized light associated with arrow 102 may be converted to s-polarized light in the process of passing through LED die 90 and reflecting off of reflector and contact layer 92. This s-polarized light may be transmitted by reflective polarizer 96 and polarizer 94 as a portion of illumination light 52 (e.g., as shown by arrow 106). At the same time, the p-polarized light associated with arrow 104 may reflect back to reflector and contact layer 92, as shown by arrow 108. The light may continue to reflect between reflective polarizer 96 and reflector and contact layer 92 (e.g., an infinite number of times), with s-polarized light in the reflected light passing through reflective polarizer 96 and polarizer 94 (e.g., as a portion of illumination light 52) for each reflection (bounce). Each bounce may contribute more s-polarized light to illumination light 52, thereby increasing the total amount of the light emitted by light source 48 that passes to prism 46 and fLCOS display panel 40 as illumination light 38 (FIG. 3). This may serve to increase the overall optical efficiency of the display module relative to scenarios where reflective polarizer 96 is omitted.

Figure 7:
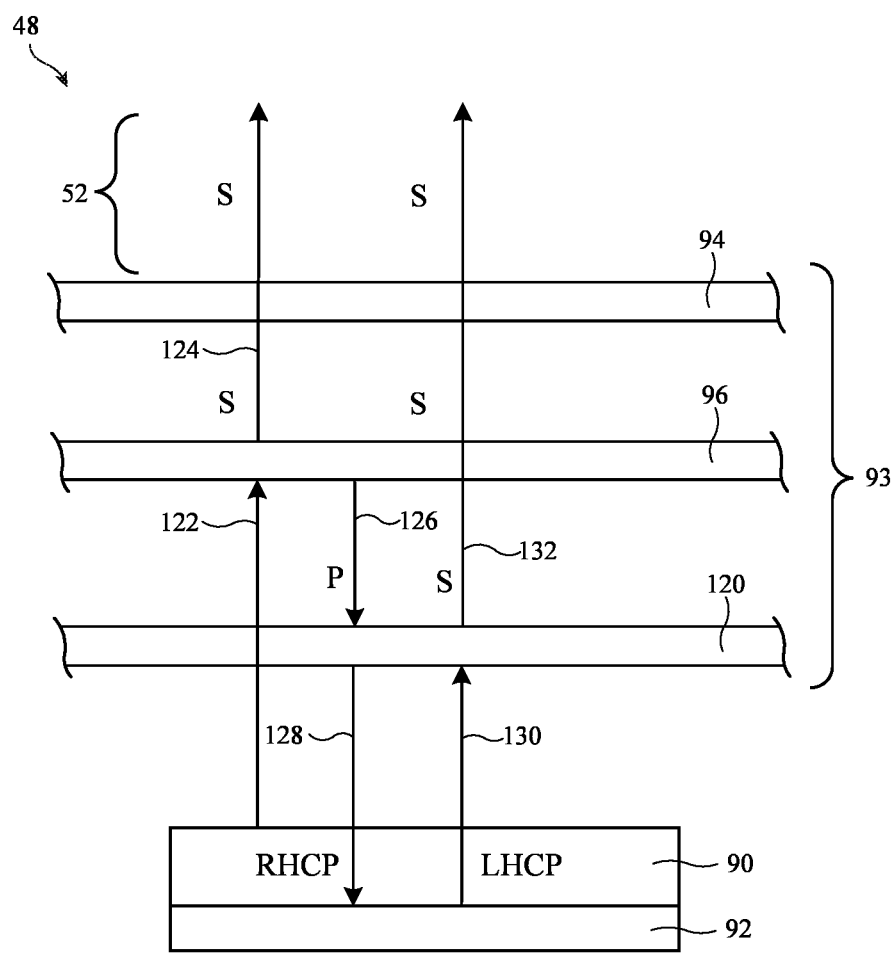
FIG. 7 is a top view of an illustrative light source having polarization recycling structures with a reflective polarizer and a quarter wave plate in accordance with some embodiments.

In order to further increase the optical efficiency of the display module, polarization recycling structures 93 may include a quarter wave plate. FIG. 7 is a diagram showing how polarization recycling structures 93 may include a quarter waveplate (QWP). As shown in FIG. 7, polarization recycling structures 93 may include a quarter waveplate such as quarter waveplate 120. Quarter waveplate 120 may be optically interposed between reflective polarizer 96 and LED die 90.

As shown by arrow 122 of FIG. 7, the unpolarized light emitted by LED die 90 may pass through quarter waveplate 120 to reflective polarizer 96. Reflective polarizer 96 may transmit light of the same polarization that is transmitted by polarizer 94 (e.g., reflective polarizer 96 may transmit s-polarized light). As shown by arrow 124, this s-polarized light may pass through polarizer 94 as a portion of illumination light 52. At the same time, reflective polarizer 96 may reflect p-polarized light back towards quarter wave plate 120, as shown by arrow 126.

Quarter waveplate 120 may convert the p-polarized light reflected by reflective polarizer 96 into right-hand circularly polarized (RHCP) light that is transmitted to reflector and contact layer 92, as shown by arrow 128. The RHCP light transmitted by quarter waveplate 120 may reflect off of reflector and contact layer 92 as left-hand circularly polarized (LHCP) light, as shown by arrow 130. Quarter waveplate 120 may convert the LHCP light associated with arrow 130 into s-polarized light. As shown by arrow 132, the s-polarized light transmitted by quarter waveplate 120 may pass through reflective polarizer 96 and polarizer 94 to form a portion of illumination light 52. Including quarter waveplate 120 in polarization recycling structures 93 may serve to increase the amount of emitted light that is converted into illumination light 52 relative to scenarios where waveplate 120 is omitted (e.g., because the LHCP light associated with arrow 130 is converted to s-polarized light without the need for additional reflections between reflective polarizer 96 and reflector and contact layer 92). This may serve to increase the overall optical efficiency of the display module relative to scenarios where polarization recycling structures 93 do not include quarter waveplate 120 (e.g., as shown in FIG. 6). If desired, quarter waveplate 120 may have a retardation value optimized for each RGB LED respectively. For example, for red light source 48A (FIG. 3), the retardation value $d\Delta n$ may be approximately $\lambda_R/4$, where $\lambda_R$ is the peak wavelength of red light source 48A. Polarizer 94 may be omitted from polarization recycling structures 93 as described herein, if desired (e.g., because the reflective polarizer 96 outputs linearly polarized light).

Figure 8:
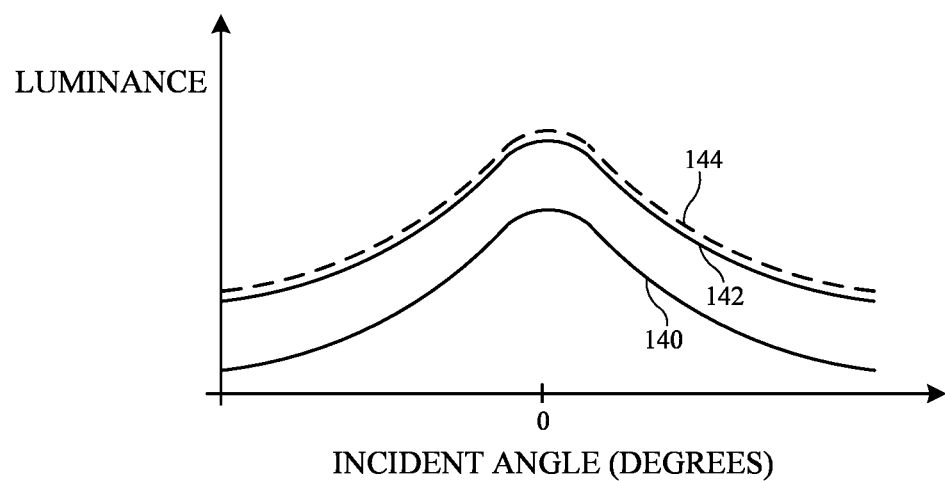
FIG. 8 is a plot of optical performance (luminance as a function of incident angle) for a light source having different polarization recycling structures in accordance with some embodiments.
Figure 9:
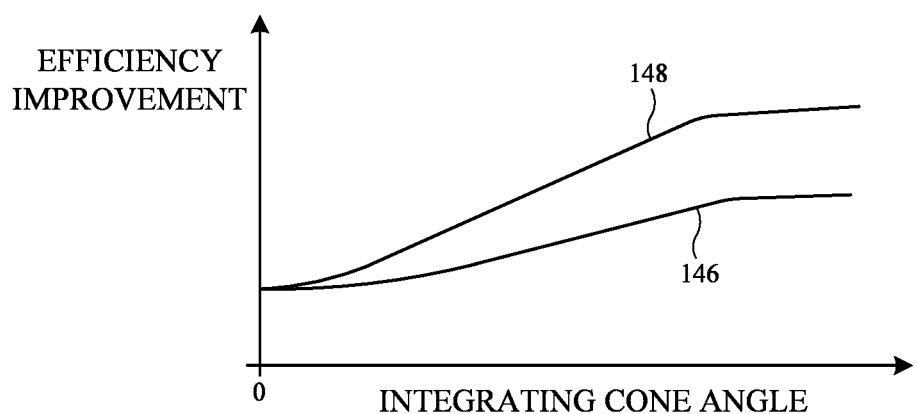
FIG. 9 is a plot of optical performance (efficiency improvement as a function of integrating cone angle) for a light source having polarization recycling structures of the types shown in FIGS. 6 and 7 in accordance with some embodiments.

FIGS. 8 and 9 are plots showing how polarization recycling structures 93 may optimize the optical performance of display module 14A. In FIG. 8, the horizontal axis plots incident angle (in degrees) and the vertical axis plots the luminance of the illumination light 52 produced by light source 48. Curve 140 of FIG. 8 plots the luminance as a function of incident angle in scenarios where polarization recycling structures 93 are omitted (e.g., scenarios in which only a polarizer such as polarizer 94 is used to convert the unpolarized light emitted by LED die 90 into polarized light for reflection by the fLCOS display panel).

Curve 142 plots the luminance as a function of incident angle for the example of FIG. 6 in which light source 48 includes polarization recycling structures 93 having reflective polarizer 94. Curve 144 plots the luminance as a function of incident angle for the example of FIG. 7 in which light source 48 includes polarization recycling structures 93 having both reflective polarizer 94 and quarter waveplate 120. As shown by curves 142 and 144, polarization recycling structures 93 may increase the luminance of light source 48 across all incident angles. Including quarter waveplate 120 may, for example, further increase the luminance of light source 48.

In FIG. 9, the horizontal axis plots integrating cone angle and the vertical axis plots the optical efficiency improvement obtained by the display module relative to scenarios where polarization recycling structures 93 are omitted (e.g., scenarios in which only a polarizer such as polarizer 94 is used to convert the unpolarized light emitted by LED die 90 into polarized light for reflection by the fLCOS display panel). Curve 146 of FIG. 9 plots the efficiency improvement for the example of FIG. 6 in which light source 48 includes polarization recycling structures 93 having reflective polarizer 96. Curve 148 plots the efficiency improvement for the example of FIG. 7 in which light source 48 includes polarization recycling structures 93 having both reflective polarizer 96 and quarter waveplate 120. As shown by curves 148 and 146, polarization recycling structures 93 may increase the efficiency of display module 14A for all integrating cone angles relative to scenarios where polarization recycling structures 93 are omitted. As shown by curve 148, including quarter waveplate 120 in polarization recycling structures 93 may further increase the optical efficiency of the display module 14A, particularly at larger integrating cone angles. The examples of FIGS. 8 and 9 are merely illustrative. Curves 140-148 may have other shapes in practice.

Figure 10:
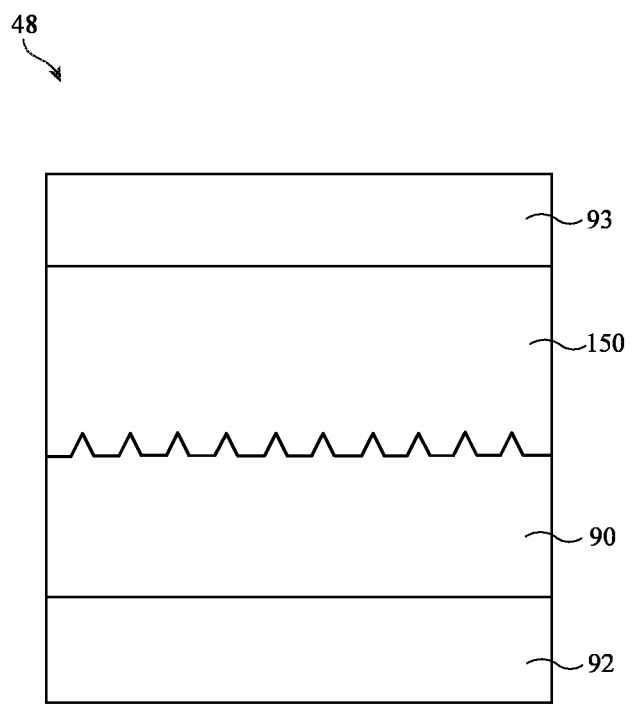
FIG. 10 is a cross-sectional side view of an illustrative light source having integral polarization recycling structures in accordance with some embodiments.

Polarization recycling structures 93 may be optically interposed between LED die 90 and prism 46 (FIG. 3) in any desired manner. FIG. 10 is a cross-sectional side view showing one illustrative example of how polarization recycling structures 93 may be integrated within light source 48. As shown in FIG. 10, light source 48 may include a substrate such as patterned silicon substrate (PSS) 150 layered over LED die 90. Polarization recycling structures 93 may be layered over PSS 150.

Figure 11:
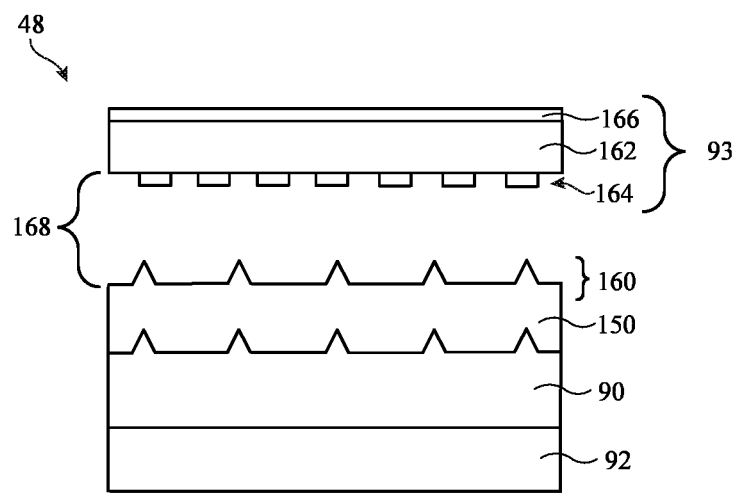
FIGS. 11 and 12 are a cross-sectional side views of an illustrative light source having polarization recycling structures separated from the emissive area of the light source by an air gap in accordance with some embodiments.

In another suitable arrangement, polarization recycling structures 93 may be separated from PSS 150 by an air gap. FIG. 11 is a cross-sectional side view showing how polarization recycling structures 93 may be separated from PSS 150 by an air gap in an example where polarization recycling structures 93 include a wire grid polarizer.

As shown in FIG. 11, polarization recycling structures 93 in light source 48 may be separated PSS 150 by air gap 168. Polarization recycling structures 93 may include a substrate such as glass layer 162 (sometimes referred to herein as cover glass layer 162) that is separated from PSS 150 by air gap 168. In another suitable arrangement, layer 162 may include sapphire or other optically transparent materials if desired. Polarization recycling structures 93 may include a wire grid polarizer such as wire grid polarizer 164 (e.g., a wire grid polarizer that forms reflective polarizer 96 of FIGS. 6 and 7) patterned onto the surface of glass layer 162 facing PSS 150. If desired, the opposing surface of glass layer 162 may be covered by an optional anti-reflective layer (coating) 166. If desired, PSS 150 may include textured surface features (e.g., surface roughness) 160 on the surface of PSS 150 at air gap 168. Textured surface features 160 may, for example, increase light extraction efficiency and/or improve emission uniformity through glass layer 162 for light source 48 relative to scenarios where textured surface features 160 are omitted.

Figure 12:
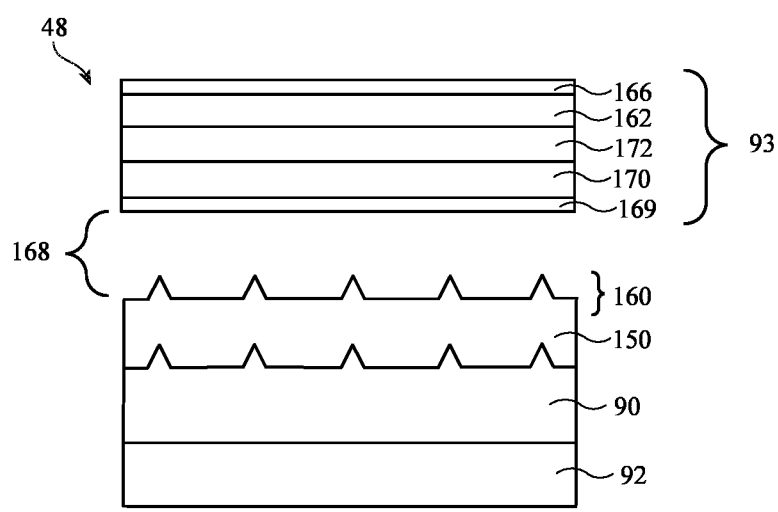

The example of FIG. 11 in which the reflective polarizer includes wire grid polarizer 164 is merely illustrative. In another suitable arrangement, the reflective polarizer may include a reflective polarizer film. FIG. 12 is a cross-sectional side view showing how polarization recycling structures 93 may be separated from PSS 150 by an air gap in an example where polarization recycling structures 93 include a reflective polarizer film.

As shown in FIG. 12, polarization recycling structures 93 may include reflective polarizer film 170. Reflective polarizer film 170 may be separated from PSS 150 by air gap 168. Reflective polarizer film 170 may form reflective polarizer 96 of FIGS. 6 and 7. An optional anti-reflective layer (coating) 169 may be layered onto the surface of reflective polarizer film 170 facing PSS 150. In examples where polarization recycling structures 93 include quarter waveplate 120 (FIG. 7), quarter waveplate 120 may be layered onto the bottom surface of reflective polarizer film 170 (e.g., quarter waveplate 120 may be interposed between reflective polarizer film 170 and anti-reflective layer 169 or PSS 150).

Reflective polarizer film 170 may be adhered to glass layer 162 by adhesive layer 172. Adhesive layer 172 may include optically clear adhesive, pressure sensitive adhesive, or other adhesives, as examples. One or both of anti-reflective layers 166 and 169 may be omitted if desired. Inclusion of air gap 168 in light source 48 may, for example, allow for a fixed distance to be maintained between the reflective polarizer (e.g., wire grid polarizer 164 of FIG. 11 or reflective polarizer film 170 of FIG. 12) and LED die 90 (e.g., a distance of 200 microns or less, 100 microns or less, etc.).

Figure 13:
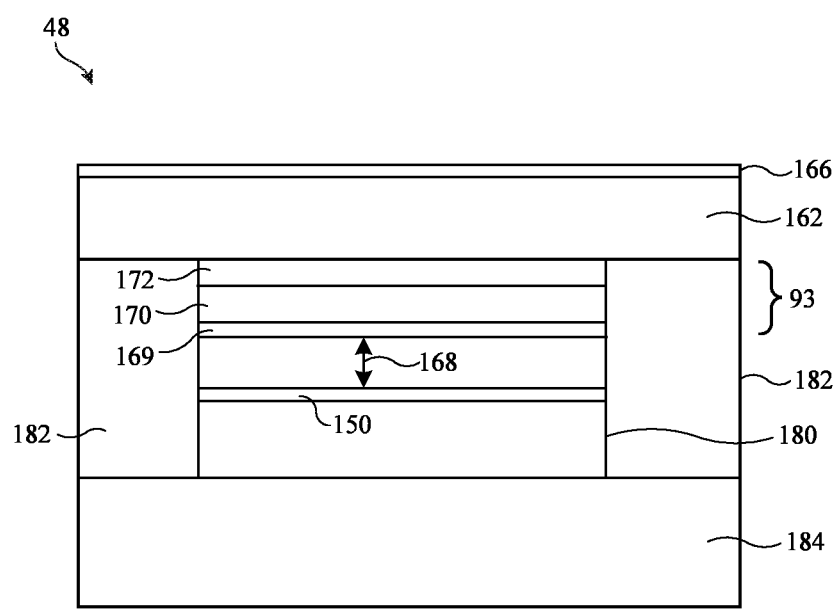
FIG. 13 is a cross-sectional side view of an illustrative light source having integral polarization recycling structures on a ceramic substrate in accordance with some embodiments.

If desired, in scenarios where light source 48 includes air gap 168, LED die 90 and polarization recycling structures 93 may be integrated into a single LED package on a ceramic substrate. FIG. 13 is a cross-sectional side view showing how LED die 90 and polarization recycling structures 93 may be integrated into a single LED package on a ceramic substrate.

As shown in FIG. 13, light source 48 may include LED chip 180 mounted to a substrate such as ceramic substrate 184. Other materials may be used to form substrate 184 if desired. LED chip 180 may include LED die 90 and reflector and contact layer 92 of FIGS. 6, 7, and 10-12, for example. PSS 150 may be layered over LED chip 180. In the example of FIG. 13, polarization recycling structures 93 include adhesive layer 172, reflective polarizer film 170, and anti-reflective layer 169 layered onto the bottom surface of glass layer 162. This is merely illustrative and, in another suitable arrangement, polarization recycling structures 93 may include wire grid polarizer 164 of FIG. 11. Anti-reflective layer 169 may be omitted if desired.

Light source 48 may include spacer and sealant 182 that couples glass layer 162 to ceramic substrate 184 (e.g., surrounding a lateral periphery of polarization recycling structures 93 and chip 180). Spacer and sealant 182 may hold glass layer 162 in place over chip 180 such that polarization recycling structures 93 are separated from PSS 150 by air gap 168.

Figure 14:
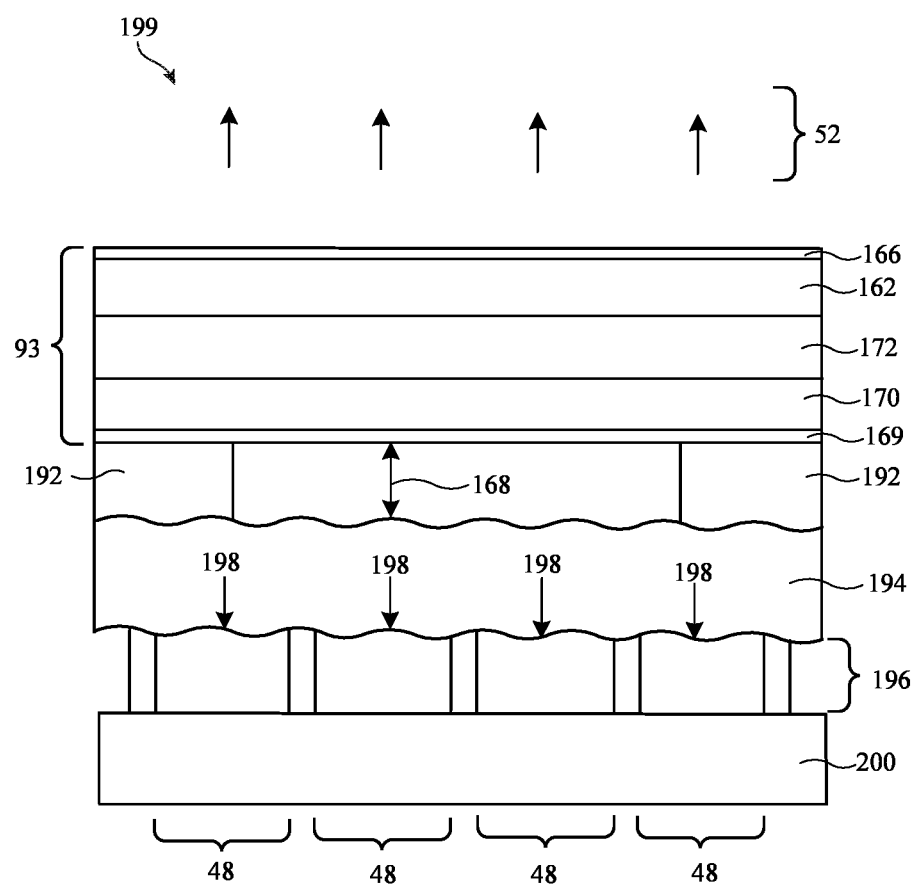
FIG. 14 is a cross-sectional side view showing how illustrative polarization recycling structures may be shared by multiple light sources in accordance with some embodiments.

Polarization recycling structures 93 of FIGS. 6, 7, and 10-13 may be used to cover a single light source 48. In another suitable arrangement, the same polarization recycling structures 93 may be shared by multiple light sources 48. FIG. 14 is a cross-sectional side view showing how multiple light sources 48 may share the same polarization recycling structures 93.

As shown in FIG. 14, multiple light sources 48 (e.g., multiple light sources 48 that emit light of the same color and that are arranged in an array) may collectively form a light source set 199 (sometimes referred to herein as light source array 199). The light sources 48 in light source set 199 may be arranged in a one-dimensional array pattern or in a two dimensional array pattern, as examples. Each light source 48 in light source set 199 may produce corresponding illumination light 52 (e.g., polarized illumination light to be provided to prism 46 of FIG. 3).

Each light source 48 in light source set 199 may include a corresponding emitter 198 mounted to a common (shared) substrate such as silicon substrate 200. Silicon substrate 200 may, for example, be a silicon driver that drives emitters 198 to emit unpolarized illumination light (e.g., based on control signals received from control circuitry 16 over control path(s) 42 of FIG. 2). The emitters 198 in light source set 199 may collectively form an emitter array 196 for light source set 199. Each emitter 198 in emitter array 196 may include a corresponding LED die 90 and reflector and contact layer 92 of FIGS. 6, 7, and 10-12 (e.g., a corresponding LED chip 180 of FIG. 13), for example.

As shown in FIG. 14, the same substrate such as sapphire substrate 194 may be layered over each of the emitters 198 in light source set 199. Similarly, the same polarization recycling structures 93 may be layered over each of the emitters 198 in light source set 199. Spacer and sealant 192 may separate polarization recycling structures 93 from sapphire substrate 194 by air gap 168. In the example of FIG. 14, polarization recycling structures 93 include adhesive layer 172, reflective polarizer film 170, and anti-reflective layer 169 layered onto the bottom surface of glass layer 162. This is merely illustrative and, in another suitable arrangement, polarization recycling structures 93 may include wire grid polarizer 164 of FIG. 11. Anti-reflective layer 169 and/or anti-reflective layer 166 may be omitted if desired.

Figure 15:
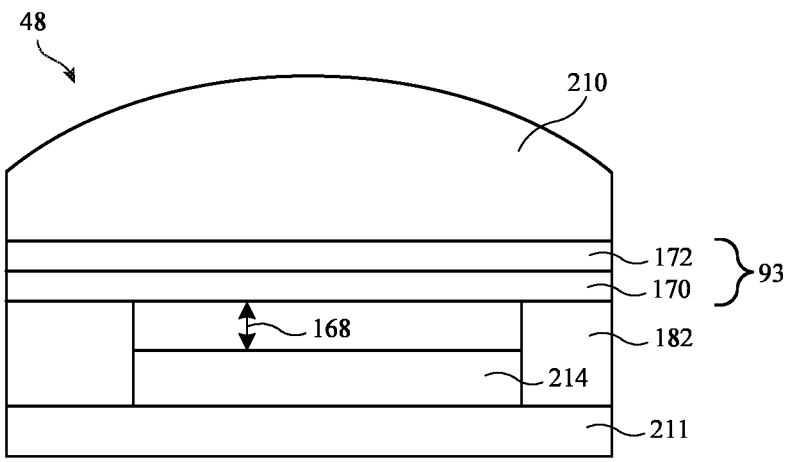
FIGS. 15 and 16 are cross-sectional side views of an illustrative light source having polarization recycling structures integrated with a condenser lens in accordance with some embodiments.
Figure 16:
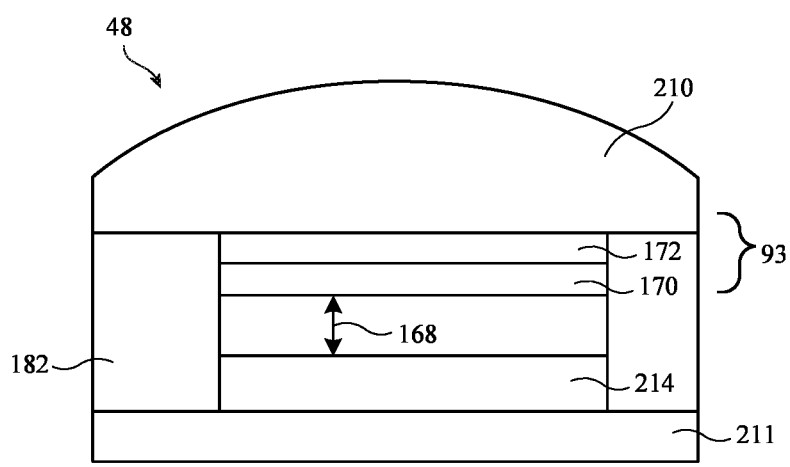

If desired, light source 48 may include a condenser lens. In these arrangements, if desired, polarization recycling structures 93 may be integrated with the condenser lens. FIGS. 15 and 16 are cross-sectional side views showing how light source 48 may include polarization recycling structures 93 integrated with a condenser lens.

As shown in FIG. 15, light source 48 may include an LED emission area 214 mounted to substrate 211. Substrate 211 may, for example, include ceramic substrate 184 of FIG. 13. LED emission area 214 may include LED chip 180 and PSS 150 of FIG. 13, PSS 150, LED die 90, and reflector and contact layer 92 of FIGS. 6, 7, and 10-12, etc. Light source 48 may include a lens such as condenser lens 210 overlapping LED emission area 214. Polarization recycling structures 93 may be layered onto the bottom (e.g., planar) surface of condenser lens 210. Spacer and sealant 182 may separate polarization recycling structures 93 from LED emission area 214 by air gap 168. Condenser lens 210 may help to focus and/or redirect the illumination light 52 produced by light source 48.

The example of FIG. 15 in which spacer and sealant 182 polarization recycling structures 93 cover an entirety of the bottom surface of condenser lens 210 is merely illustrative. In another suitable arrangement, polarization recycling structures 93 may cover only the portion of condenser lens 210 overlapping LED emission area 214, as shown in FIG. 16. In this example, spacer and sealant 182 may separate the bottom surface of condenser lens 210 from substrate 211 such that polarization recycling structures 93 are separated from LED emission area 214 by air gap 168.

In the example of FIGS. 15 and 16, polarization recycling structures 93 include adhesive layer 172 and reflective polarizer film 170 layered onto the bottom surface of condenser lens 210. This is merely illustrative and, if desired, polarization recycling structures 93 may include wire grid polarizer 164 of FIG. 11 or any other desired structures. Quarter waveplate 120 of FIG. 7 may be layered onto the bottom surface of reflective polarizer film 170 or may be otherwise optically interposed between reflective polarizer film and the LED emission area in any of the examples of FIGS. 11-16, if desired. Light source 48 may include other structures for producing polarized illumination light 52 if desired.

Figure 17:
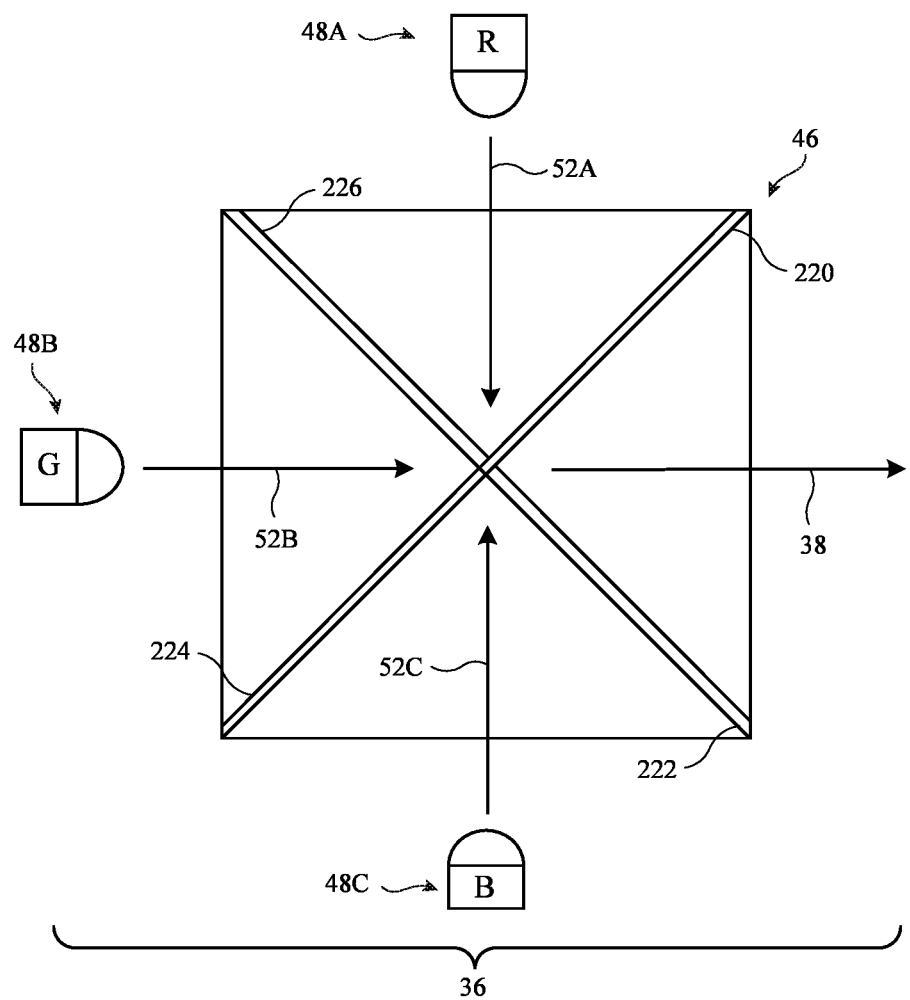
FIG. 17 is a top view of an illustrative X-plate that may be provided with interference coatings for reflecting and transmitting light from light sources in accordance with some embodiments.

Polarizing illumination light 52 prior to passing illumination light 52 to prism 46 of FIG. 17 may serve to optimize the optical performance of the display module. For example, as shown in the top-down view of FIG. 17, prism 46 in illumination optics 36 may include an X-plate formed from a first partial reflector 220 that intersects with a second partial reflector 222. First partial reflector 220 may include coating 224. Second partial reflector 222 may include coating 226. Coatings 224 and 226 may sometimes be referred to herein as material interfaces and may include laminated interference films, diffractive elements that serve as a beam combiner, or other types of coatings or material interfaces. Prism 46 may include the X-plate formed from partial reflectors 220 and 222 with or without optical wedges between the partial reflectors.

Coatings 224 and 226 may be wavelength-selective filters that configure partial reflectors 220 and 222 to reflect illumination light of corresponding wavelengths while transmitting light of other wavelengths. For example, coating 226 may configure partial reflector 222 to reflect illumination light of the wavelengths produced by light source 48A (e.g., red illumination light 52A) while transmitting illumination light of the wavelengths produced by light sources 48B and 48C. Coating 224 may configure partial reflector 220 to reflect illumination light of the wavelengths produced by light source 48C (e.g., blue illumination light 52C) while transmitting illumination light of the wavelengths produced by light sources 48A and 48B. The illumination light transmitted by light source 48B (e.g., green illumination light 52B) may be transmitted by partial reflectors 220 and 222 without being reflected. In this way, the X-plate (e.g., prism 46) may serve as a beam combiner that combines illumination light 52A, 52B, and 52C to produce illumination light 38.

Illumination light 52A-C may be polarized illumination light (e.g., polarized illumination light as produced by polarization recycling structures 93 of FIGS. 6, 7, and 10-16). The illumination light 38 produced by prism 46 will therefore have the same polarization as illumination light 52A-C. Polarizing illumination light 52A-C prior to the illumination light passing through prism 46 may serve to optimize the spectral performance of illumination light 38, for example.

Figure 18:
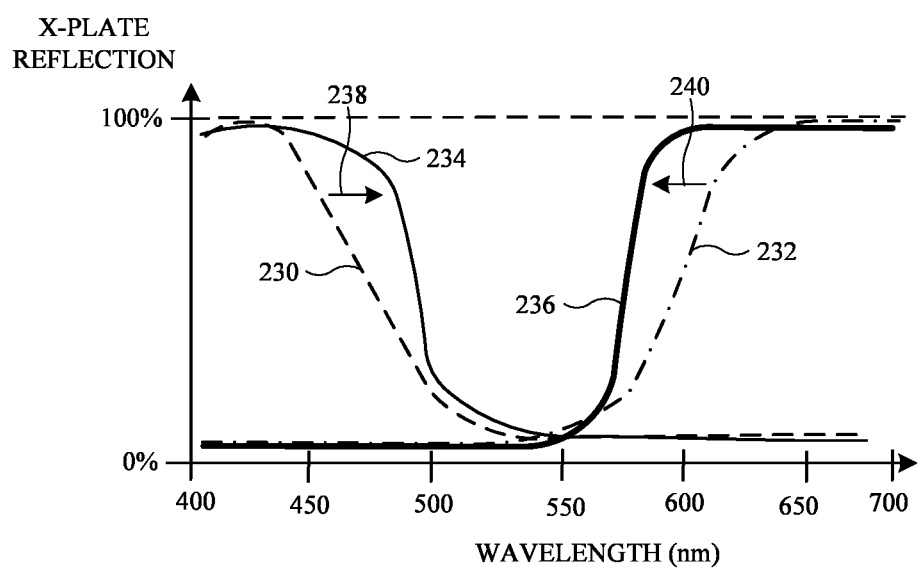
FIG. 18 is a plot showing how polarization recycling structures may optimize optical performance (X-plate reflection as a function of wavelength) for light sources in a display module in accordance with some embodiments.

FIG. 18 is a plot showing how polarizing illumination light 52A-C prior to the illumination light passing through prism 46 may serve to optimize the spectral performance of illumination light 38. The horizontal axis of FIG. 18 plots wavelength (e.g., in nm) and the vertical axis of FIG. 18 plots the amount of reflection performed by prism 46 (e.g., where 0% reflection corresponds to an entirety of the illumination light being transmitted by prism 46 and 100% corresponds to an entirety of the illumination light being reflected by prism 46).

Curve 230 of FIG. 8 plots the reflection, by prism 46, of the illumination light 52C emitted by light source 48C (e.g., blue illumination light) in scenarios where illumination light 52C is unpolarized. Curve 232 plots the reflection, by prism 46, of the illumination light 52A emitted by light source 48A (e.g., red illumination light) in scenarios where illumination light 52A is unpolarized. As shown by curve 230, partial reflector 220 and coating 224 (FIG. 17) may exhibit a relatively shallow roll-off in reflecting unpolarized blue light as wavelength increases. Similarly, as shown by curve 232, partial reflector 222 and coating 226 may exhibit a relatively shallow roll-off in reflecting unpolarized red light as wavelength decreases.

Curve 234 plots the reflection, by prism 46, of the illumination light 52C emitted by light source 48C (e.g., blue illumination light) in scenarios where illumination light 52C is polarized (e.g., by polarization recycling structures 93 of FIGS. 6, 7, and 10-16). Curve 236 plots the reflection, by prism 46, of the illumination light 52A emitted by light source 48A (e.g., red illumination light) in scenarios where illumination light 52A is polarized (e.g., by polarization recycling structures 93 of FIGS. 6, 7, and 10-16).

As shown by curve 234 and arrow 238, providing polarized blue illumination light to prism 46 may cause partial reflector 220 and coating 224 to exhibit a steeper roll-off in reflecting blue light as wavelength increases than in scenarios where unpolarized blue light is provided to prism 46. Similarly, as shown by curve 236 and arrow 240, providing polarized red illumination light to prism 46 may cause partial reflector 222 and coating 226 to exhibit a steeper roll-off in reflecting red light as wavelength decreases than in scenarios where unpolarized red light is provided to prism 46. This may serve to optimize the spectral response of the illumination light 38 output by prism 46, for example. The example of FIG. 18 is merely illustrative. Curves 230-236 may have other shapes in practice. In general, prism 46 may combine illumination light 52 of any desired wavelengths to produce illumination light 38 that is provided to fLCOS display panel 40 of FIG. 3.

In general, the efficiency of the LEDs in light sources 48 may depend on the current density used to drive the LEDs. In addition, different color LEDs exhibit peak LED efficiency at different current densities. In practice, green LEDs such as an LED in light source 48B may reach peak LED efficiency at a lower current density than red LEDs (e.g., in light source 48A) and/or blue LEDs (e.g., in light source 48C). In order to reduce the overall power consumption of display module 14A, light source 48B may therefore be driven with a lower current density than light sources 48A and/or 48C.

The light sources 48A-C in illumination optics 36 may be driven using a corresponding illumination sequence. The illumination sequence may specify the order in which each light source 48 is activated to produce illumination light 38. In some scenarios, the illumination scheme is an RGBRGB illumination scheme. However, if care is not taken, driving light sources 48 using an RGBRGB illumination scheme while reducing the current density used to drive light source 48B may cause illumination light 38 to exhibit less overall brightness at green wavelengths. This may lead to an unsightly color and brightness imbalance in the images produced at eye box 24 (FIG. 2). In order to mitigate these issues while driving light source 48B with a reduced current density, light sources 48A-C may be driven using a green-heavy illumination sequence.

Figure 19:
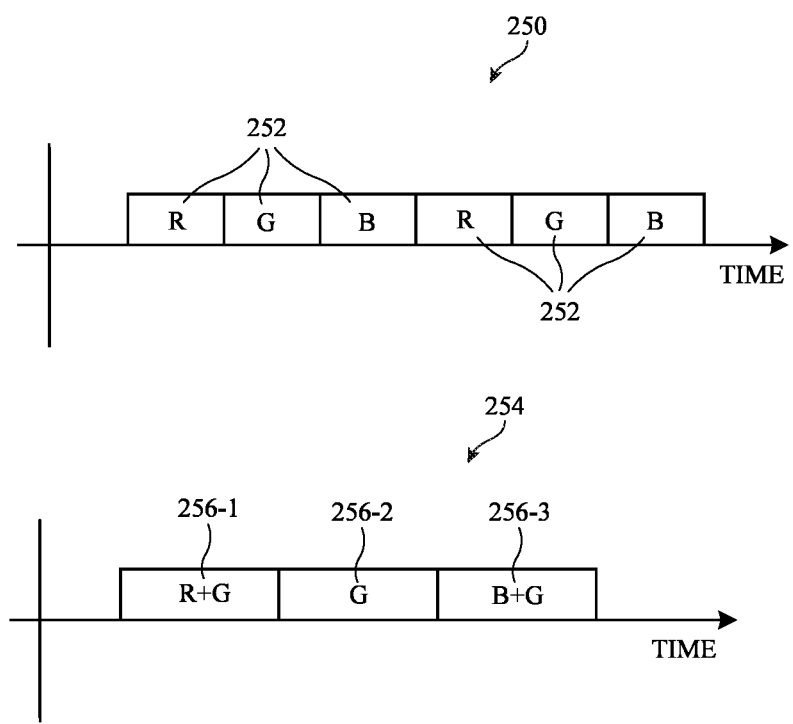
FIG. 19 is a timing diagram of illustrative illumination sequences that may be used by light sources to optimize power consumption in a display module in accordance with some embodiments.

FIG. 19 is a timing diagram of illustrative illumination sequences that may be used to drive light sources 48A-C. As shown in FIG. 19, an RGBRGB illumination sequence 250 may be used to drive light sources 48A-C in some scenarios. RGBRGB illumination sequence 250 may involve the sequential activation of only one of light sources 48A-C at any given time.

Under RGBRGB illumination sequence 250, for a given image frame, red light source 48A may be active for a first time period (slot) 252, during which red light source 48A emits red (R) illumination light 52A of FIGS. 3 and 17 (e.g., illumination light as polarized using polarization recycling structures 93 of FIGS. 6, 7, and 10-16). Green light source 48B and blue light source 48C may be inactive during the first time period 252 (e.g., green light source 48B and blue light source 48C may not emit any illumination light during the first time period 252). Green light source 48B may be active for a subsequent second time period 252, during which green light source 48B emits green (G) illumination light 52B. Red light source 48A and blue light source 48C may be inactive during the second time period 252 (e.g., red light source 48A and blue light source 48C may not emit any illumination light during the second time period 252). Blue light source 48C may be active during a subsequent third time period 252, during which blue light source 48C emits blue (B) illumination light 52C. Red light source 48A and green light source 48B may be inactive during the third time period 252 (e.g., red light source 48A and green light source 48B may not emit any illumination light during the third time period 252). Red light source 48A may be active during a subsequent fourth time period 252, green light source 48B may be active during a subsequent fifth time period 252, and blue light source 48C may be active during a subsequent sixth time period 252 (e.g., each light source may be active during two time periods 252 for a given image frame to be displayed by display module 14A).

In order to minimize power consumption by illumination optics 36, green light source 48B may be driven using lower current density than the green light source would have otherwise been driven under a different illumination sequence for a given field (e.g., while recovering similar visual performance). In order to recover the same overall brightness at green wavelengths as would otherwise be obtained if a higher current density were used to drive green light source 48B, light sources 48A-C may be driven using green-heavy illumination sequence 254 of FIG. 19.

Green-heavy illumination sequence 254 may include three time periods (slots) 256 that are used to produce illumination light 38 for a given image frame (e.g., a first time period 256-1, a subsequent second time period 256-2, and a subsequent third time period 256-3). Each time period 256 may correspond to an image subframe (field) that is displayed using fLCOS display panel 40. Both red light source 48A and green light source 48B may be active for first time period 256-1. During first time period 256-1, red light source 48A may emit red (R) illumination light 52A and green light source 48B may emit green (G) illumination light 52B. Prism 46 (FIGS. 3 and 17) may combine illumination light 52A and 52B to produce illumination light 38. Blue light source 48C may be inactive during first time period 256-1.

Green light source 48B may be active for second time period 256-2. During second time period 256-2, green light source 48B may emit green illumination light 52B. Prism 46 (FIGS. 3 and 17) may produce illumination light 38 based on the green illumination light 52B. Red light source 48A and blue light source 48C may be inactive during second time period 256-2.

Both blue light source 48C and green light source 48B may be active for third time period 256-3. During third time period 256-3, blue light source 48C may emit blue (B) illumination light 52C and green light source 48B may emit green illumination light 52B. Prism 46 (FIGS. 3 and 17) may combine illumination light 52C and 52B to produce illumination light 38. Red light source 48A may be inactive during third time period 256-3.

In other words, green light source 48B may be active during each of the time periods 256 used to display a corresponding image frame (e.g., green light source 48B may contribute to the blue and red portions of the illumination sequence). By contributing green illumination light 52B to illumination light 38 in each time period 256 (e.g., by increasing the total on time for green light source 40B per image frame), the total illumination time for the green light source may be greater than in scenarios where RGBRGB illumination sequence 250 is used. This may allow green light source 48B to be driven with lower current density without significantly sacrificing optical performance, thereby minimizing power consumption in display module 14A.

The example of FIG. 19 is merely illustrative. If desired, other green-heavy illumination sequences having any desired number of periods 256 may be used (e.g., illumination sequences where green light source 48B is active during a greater number of time periods 256 per frame than red light source 48A and blue light source 48C). If desired, red light source 48A and/or blue light source 48C may be active during second time period 256-2 (e.g., where red light source 48A is driven using less current density than during time period 256-1 and where blue light source 48C is driven using less current density than during time period 256-3). Light sources 48A-C may emit illumination light of any respective colors, in general.

Figure 20:
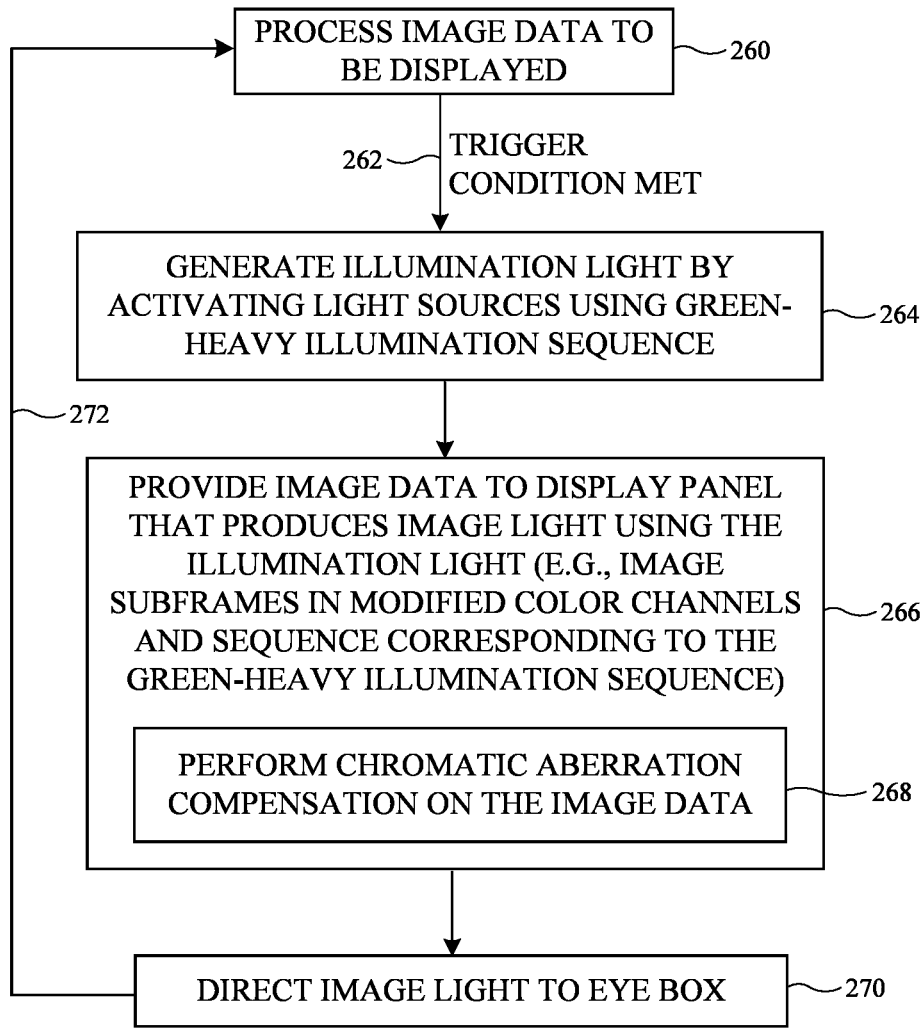
FIG. 20 is a flow chart of illustrative steps that may be involved in controlling an fLCOS display panel to display images based on a green-heavy illumination sequence in accordance with some embodiments.

FIG. 20 is a flow chart of illustrative steps that may be performed by system 10 to display images using a green-heavy illumination sequence such as green-heavy illumination sequence 254 of FIG. 19.

At step 260, control circuitry 16 (FIG. 2) may process image data to be displayed at eye box 24. The image data may include a stream of image frames. Control circuitry 16 may determine whether a trigger condition has been met before beginning to display images using the green-heavy illumination sequence.

If desired, control circuitry 16 may determine whether the trigger condition has been met based on the content of the image data to be displayed. For example, control circuitry 16 may determine that the trigger condition has been met when one or more image frames to be displayed exhibit a saturation level that exceeds a threshold saturation level (e.g., a green saturation level that exceeds a threshold green saturation level). If desired, the green-heavy illumination sequence may be disregarded in favor of another illumination sequence (e.g., RGBRGB illumination sequence 250 of FIG. 19) in scenarios where use of a green-heavy illumination sequence is unlikely to result in an improvement in power consumption and/or optical performance. This is merely illustrative and, in general, any desired trigger condition may be used (e.g., a command to begin using the green-heavy illumination sequence issued by a software call on system 10, a command to begin using the green-heavy illumination sequence as identified by user input provided to system 10, etc.). In some examples, the above trigger condition(s) may be used when the optical system is free of chromatic aberration. In one suitable arrangement that is sometimes described herein as an example (e.g., in scenarios where chromatic aberration is present), the trigger condition may be an ambient light level identified by ambient light sensor data collected by one or more ambient light sensors in system 10. If desired, different green light doping ratios may be used (e.g., in the green-heavy illumination sequence) based on the current measured ambient light level (e.g., control circuitry 16 may adjust the relative amount of green illumination in each of the time periods of the illumination sequence based on the ambient light sensor data such that different relative amounts are used when different ambient light levels are detected). This may help to ensure that chromatic aberration artifacts remain invisible to the eye, for example When the trigger condition has been met, processing may proceed to step 264, as shown by arrow 262. At step 264, control circuitry 16 may control light sources 48A-C to generate illumination light 38 using the green-heavy illumination sequence. Control circuitry 16 may, for example, provide driving signals to light sources 48A-C over control path(s) 42 (FIG. 2) (e.g., driving signals with a corresponding current density) that selectively activate light sources 48A-C in accordance with the green-heavy illumination sequence (e.g., green-heavy illumination sequence 254 of FIG. 19) for each image frame to be displayed. Control circuitry 16 may drive green light source 48B with lower current density than for display of the same image data using RGBRGB illumination sequence 250, minimizing power consumption in system 10 by meeting the peak efficiency of the green LED in green light source 48B.

If desired, step 266 may be performed concurrently with step 264. At step 266, control circuitry 16 may provide image data to fLCOS display panel 40 (FIG. 3). The image data may include image frame(s) (e.g., as processed at step 260). Each image frame may be used to control each pixel P* in fLCOS display panel 40 to modulate illumination light 38 (e.g., illumination light as generated in accordance with the green-heavy illumination scheme) to produce corresponding image light 22.

Each image frame may be divided into sub-frames or fields to be displayed during each time period 256 of the green-heavy illumination sequence (FIG. 19). For example, for a given image frame, a first sub-frame (field) of the image frame may be driven onto fLCOS display panel 40 during time period 256-1 of FIG. 19 (e.g., for producing a first sub-frame in image light 22 using the polarized red and green illumination light produced during time period 256-1), a second sub-frame (field) of the image frame may be driven onto fLCOS display panel 40 during time period 256-2 (e.g., for producing a second sub-frame in image light 22 using the polarized green illumination light produced during time period 256-2), and a third sub-frame (field) of the image frame may be driven onto fLCOS display panel 40 during time period 256-3 (e.g., for producing a third sub-frame in image light 22 using the polarized green and blue illumination light produced during time period 256-3). If desired, control circuitry 16 may perform chromatic aberration compensation operations when driving fLCOS display panel 40 with the image data (optional step 268).

At step 270, optical system 14B (FIG. 2) may direct the image light 22 produced by display module 14A towards eye box 24. Processing may subsequently loop back to step 260, as shown by arrow 272, as additional image frames are processed for display at the eye box. Control circuitry 16 may cycle through these steps rapidly enough so that each of the different-colored sub-frames appears at eye box 24 as a series of multi-color image frames to the user at eye box 24 (e.g., image frames having a corresponding color gamut and that appears visually similar to how the image frames appear to the user in scenarios where green light source 48B is driven with higher current density using an RGBRGB illumination sequence). In this way, power consumption in display module 14A may be minimized without significantly reducing image quality at eye box 24.

Figure 21:
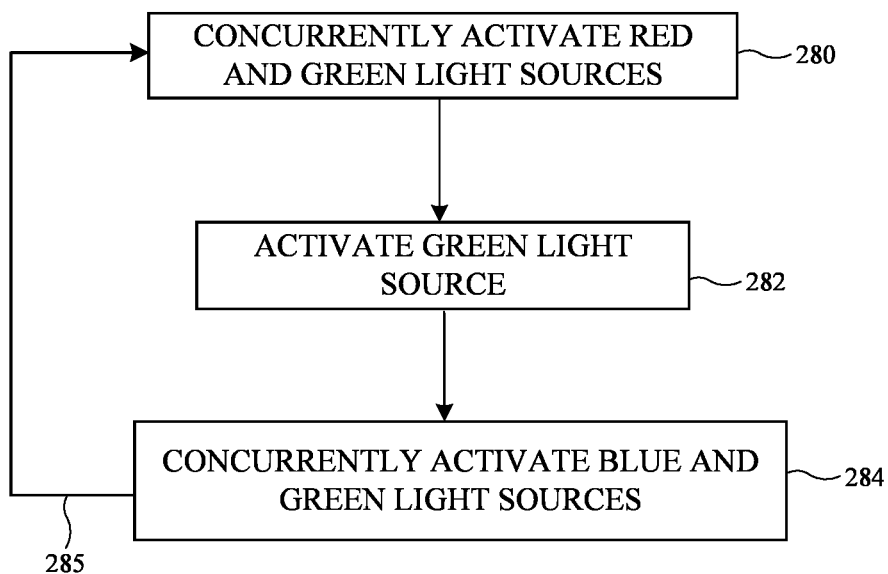
FIG. 21 is a flow chart of illustrative steps that may be involved in controlling light sources using a green-heavy illumination sequence in accordance with some embodiments.

FIG. 21 is a flow chart of illustrative steps that may be performed by control circuitry 16 in driving light sources 48A-C using the green-heavy illumination sequence (e.g., green-heavy illumination sequence 254 of FIG. 19). The steps of FIG. 21 may, for example, be performed while processing step 264 of FIG. 20 (e.g., for a given image frame to be displayed at the eye box).

At step 280 of FIG. 21, control circuitry 16 may concurrently activate (turn on) red light source 48A and green light source 48B to produce red illumination light 52A and green illumination light 52B (e.g., during time period 256-1 of FIG. 19). This may produce a corresponding sub-frame (field) of the image frame having a color given by the combination of red illumination light 52A and green illumination light 52B. Blue light source 48C may be inactive (turned off).

At step 282, control circuitry 16 may activate (turn on) green light source 48B to produce green illumination light 52B (e.g., during time period 256-2 of FIG. 19). This may produce a corresponding sub-frame (field) of the image frame having a green color given by green illumination light 52B. Red light source 48A and blue light source 48C may be inactive (turned off).

At step 284, control circuitry 16 may concurrently activate (turn on) blue light source 48C and green light source 48B to produce blue illumination light 52C and green illumination light 52B (e.g., during time period 256-3 of FIG. 19). This may produce a corresponding sub-frame (field) of the image frame having a color given by the combination of blue illumination light 52C and green illumination light 52B. Red light source 48A may be inactive (turned off). Processing may subsequently loop back to step 280, as shown by arrow 285, as additional image frames are displayed. The steps of FIG. 21 are merely illustrative and may, in general, be adapted to the particular green-heavy illumination sequence that is used to produce illumination light 38.

Figure 22:
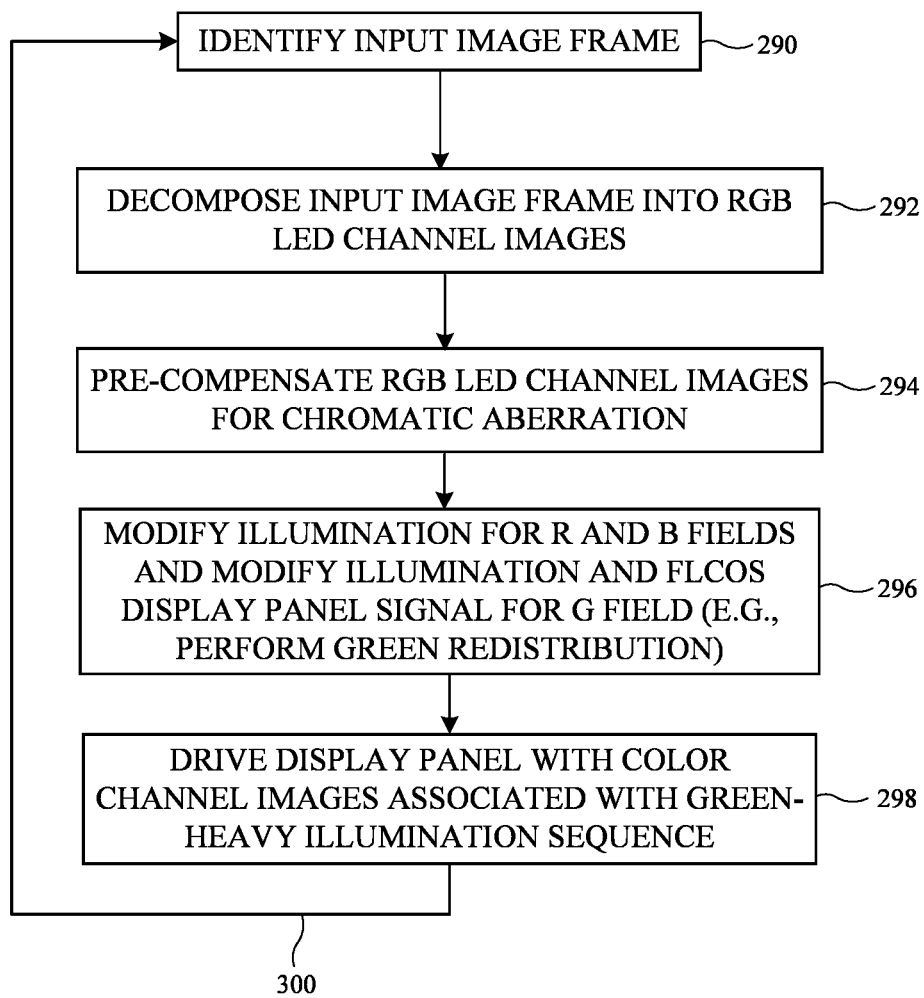
FIG. 22 is a flow chart of illustrative steps for driving an fLCOS display panel to compensate for chromatic aberrations in a display module in accordance with some embodiments.

FIG. 22 is a flow chart of illustrative steps that may be performed by control circuitry 16 in performing chromatic aberration compensation operations while driving fLCOS display panel 40 with the image data (e.g., while producing image light 22 using green-heavy illumination sequence 254 of FIG. 19). The steps of FIG. 22 may, for example, be performed while processing step 268 of FIG. 20 (e.g., for a given image frame to be displayed at the eye box). The steps of FIG. 22 may be performed to compensate for chromatic aberrations introduced into image light 22 by collimating lens 34 and/or any other desired optical components in display module 14A and/or optical system 14B (FIG. 2).

At step 290, control circuitry 16 may identify an image frame to be driven onto fLCOS display panel 40 for producing image light 22 in response to illumination light 38.

At step 292, control circuitry 16 may decompose the image frame into a red (R) LED channel image (sub-frame), a blue (B) LED channel image (sub-frame), and a green (G) LED channel image (sub-frame), for example.

At step 294, control circuitry 16 may pre-compensate the red, blue, and green LED channel images for chromatic aberration that will be introduced into image light 22 by the optical components of system 10 (e.g., control circuitry 16 may generate chromatic aberration pre-compensated red, blue, and green channel images). The amount of pre-compensation that needs to be introduced to each channel image to compensate for chromatic aberration may, for example, be determined during the design, manufacture, assembly, and/or testing of system 10 (e.g., in a manufacturing, testing, or calibration system). The pre-compensation may be performed, for example, by shifting the relative pixel position of portions of the image frame that will be subject to chromatic aberrations by different amounts across each of the color channels/fields.

At step 296, control circuitry 16 may perform green redistribution operations. For example, control circuitry 16 may first modify the red illumination light from light source 48A to a combination of red and green light from light sources 48A and 48B, without changing the corresponding image data used to drive fLCOS display panel 40 (sometimes referred to herein as the fLCOS display panel signal). Control circuitry 16 may then modify the blue illumination light from light source 48C to a combination of blue and green light from light sources 48B and 48C, without changing the corresponding fLCOS display panel signal. The red and blue illumination light may be modified to include 1-10% green illumination, between 2-8% green illumination, between 5-20% green illumination, around 5% green illumination, or any other desired amount of green illumination (sometimes referred to herein as the green light doping ratio). Control circuitry 16 may then modify the image data used to drive fLCOS display panel 40 for the green channel, by subtracting, from the image data for the green channel, image data corresponding to the amount of green illumination that was added into the red channel (e.g., in modifying the red illumination light as described above) and the amount of green illumination that was added into the blue channel (e.g., in modifying the blue illumination light as described above). Next, any negative signal values in the modified signal may be changed to zero (e.g., a black level) and excessive green illumination values (e.g., green illumination values that exceed a threshold value) may be changed to the maximum brightness of the field (e.g., as determined by the corresponding green light doping ratio).

At step 298, control circuitry 16 may drive fLCOS display panel 40 using color channel images (image data) associated with the green-heavy illumination sequence. For example, control circuitry 16 may drive fLCOS display panel 40 using an (R+G) channel image for the combination of red and green illumination light (e.g., during time period 256-1 of FIG. 19), then using a green (G) channel image as modified during step 296 (e.g., during time period 256-2 of FIG. 19), then using a (B+G) channel image for the combination of blue and green light (e.g., during time period 256-3 of FIG. 19). The corresponding image light 22 produced by fLCOS display panel 40 may be pre-compensated for chromatic aberrations by the optical components along the remainder of the optical path between display module 14A and eye box 24 (FIG. 2). After passing to eye box 24, the chromatic aberrations introduced by these optical components may cancel out the pre-compensation in the image light, thereby providing the eye box with images that are free from chromatic aberrations. Processing may subsequently loop back to step 290, as shown by arrow 300, as additional image frames are displayed.

In this way, power consumption may be minimized in display module 14A without significantly sacrificing image quality. The green-heavy illumination sequence need not be limited to fLCOS display systems and may, in general, be used to produce image light 22 in scenarios where display module 14A includes a DMD display panel, an emissive display panel, etc.

Figure 23:
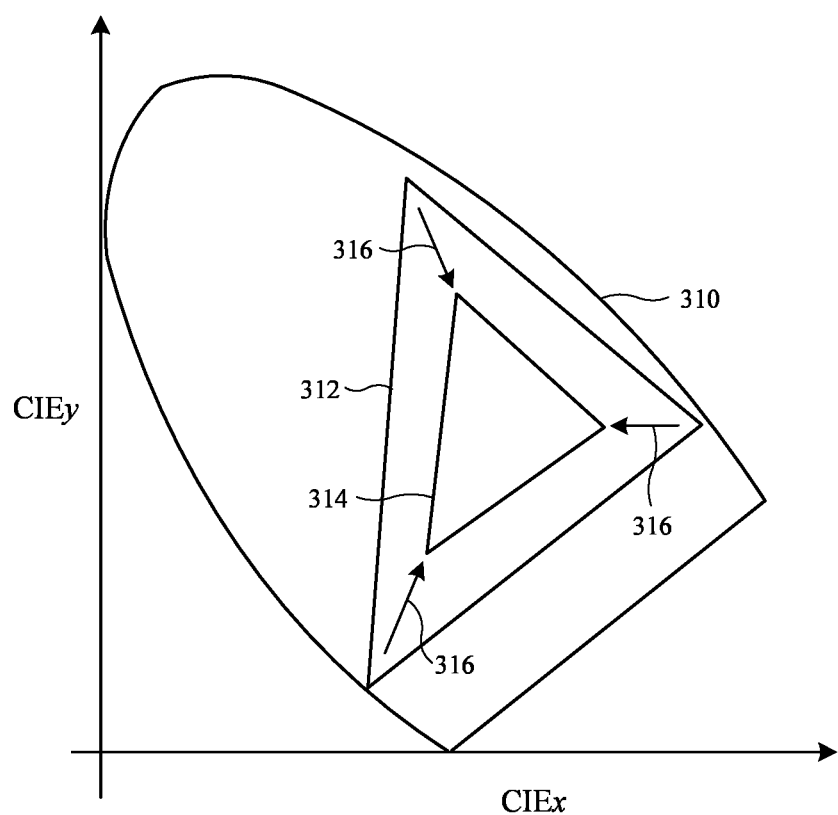
FIG. 23 is a CIE1931 color space plot that shows how illuminating an fLCOS panel using an illustrative green-heavy illumination sequence may modify the color gamut for images produced by the fLCOS panel in accordance with some embodiments.

Because green light source 48B is turned on more frequently under the green-heavy illumination sequence, the green-heavy illumination sequence may serve to shrink the overall color gamut of display module 14A. FIG. 23 is a CIE1931 color space plot showing how the green-heavy illumination sequence may serve to shrink the overall color gamut of display module 14A. As shown in FIG. 23, display module 14A may display images using a relatively large color gamut 312 (e.g., within overall color space 310) in scenarios where a green-heavy illumination sequence is not used to produce illumination light 38. The green-heavy illumination sequence may serve to reduce the color gamut of display module 14A to color gamut 314, as shown by arrows 316. Reducing the color gamut of display module 14A to color gamut 314 may serve to reduce the power consumption of display module 14A relative to scenarios where an RGBRGB illumination sequence is used, for example. The example of FIG. 23 is merely illustrative. In general, color space 310, color gamut 312, and color gamut 314 may have other shapes.

In practice, it may be desirable to be able to increase both the field of view of and the resolution of the images in image light 22 provided to eye box 24. In one suitable arrangement that is described herein as an example, the effective resolution of images provided to eye box 24 may be increased by performing pixel shifting operations in display 14.

Figure 24:
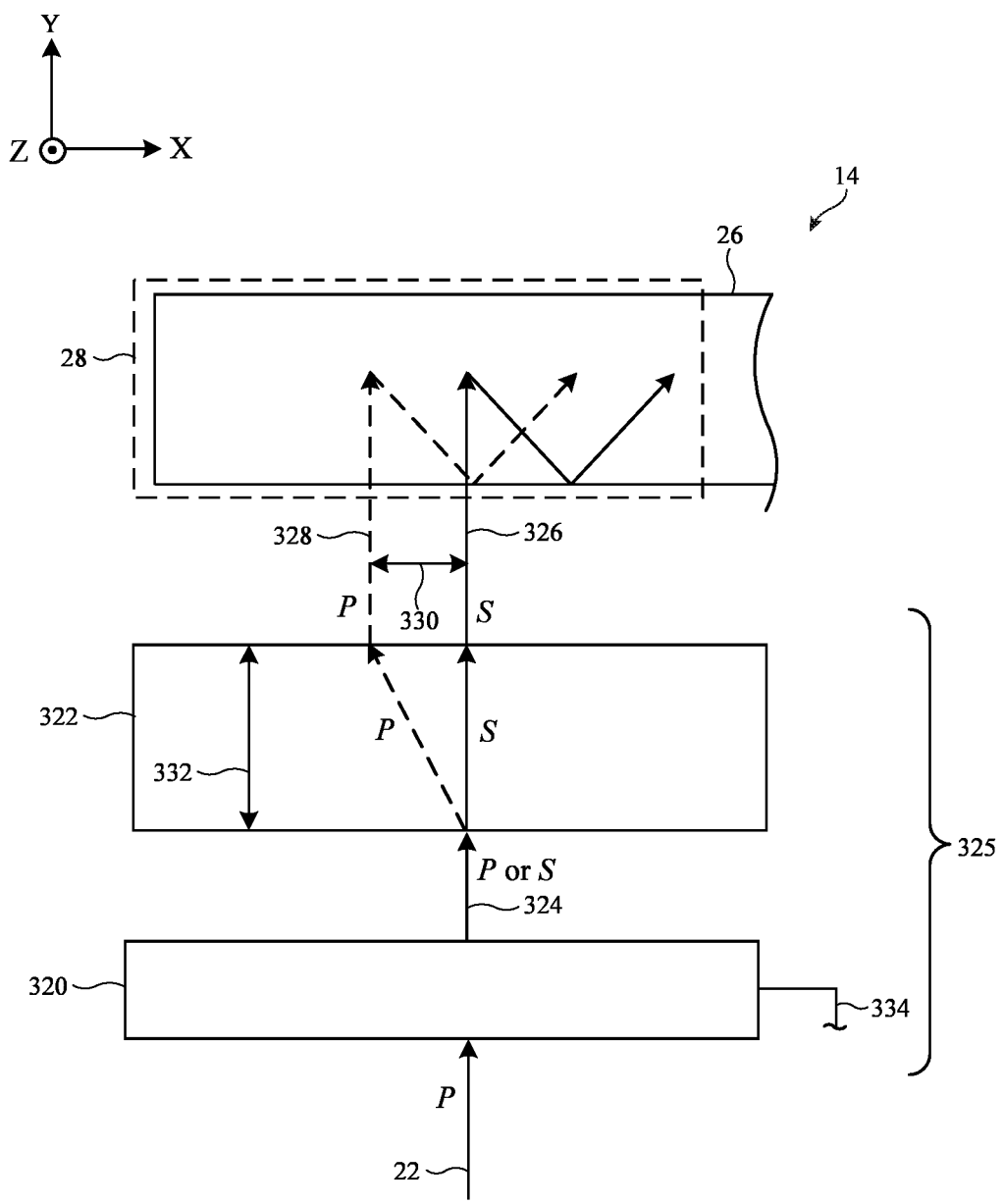
FIG. 24 is a top view of an illustrative display having spatial pixel shifting structures that increase the effective resolution of images provided at an eye box in accordance with some embodiments.

FIG. 24 is a top-down view showing how display 14 may perform spatial pixel shifting operations to maximize the effective resolution of images provided to eye box 24. As shown in FIG. 24, display 14 may include a twisted nematic (TN) cell 320 and a birefringent crystal 322 optically interposed between display module 14A (FIG. 2) and input coupler 28 on waveguide 26. Birefringent crystal 322 may be optically interposed between TN cell 320 and input coupler 28. If desired, TN cell 320 and/or birefringent crystal 322 may be formed within display module 14A of FIG. 2 (e.g., collimating lens 34 of FIG. 2 may be optically interposed between birefringent crystal 322 and input coupler 28).

TN cell 320 may receive image light 22 from fLCOS panel 40 (FIG. 3). Image light 22 may be (linearly) polarized light such as p-polarized light or s-polarized light. An arrangement in which image light 22 is incident upon TN cell 320 as p-polarized light is described herein as an example.

TN cell 320 may receive control signals from control circuitry 16 (FIG. 2) over control path 334. The control signals may toggle TN cell 320 between first and second states. In the first state, TN cell 320 may transmit image light 22 without changing the polarization of image light 22. TN cell 320 may thereby transmit p-polarized image light 22 to birefringent crystal 322 in the first state, as shown by arrow 324. In the second state, TN cell 320 may change the polarization of image light 22 to a different linear polarization. For example, in the second state, TN cell 320 may convert the p-polarized image light 22 received from fLCOS display panel 40 into s-polarized image light 22 and may transmit the s-polarized image light 22 to birefringent crystal 322, as shown by arrow 324.

Birefringent crystal 322 (sometimes referred to herein as birefringent beam displacer 322) may be formed from a birefringent material such as calcite and may have a length (thickness) 332 (e.g., in the direction of the optical path). Birefringent crystal 322 may be a uniaxial birefringent crystal or a biaxial birefringent crystal, as examples. Birefringent crystal 322 may receive p-polarized image light 22 or s-polarized image light 22 from TN cell 320 (e.g., depending on the current state of TN cell 320).

Birefringent crystal 322 may spatially separate incident image light 22 based on the polarization of the image. For example, birefringent crystal 322 may output incident s-polarized image light 22 within a first beam, as shown by arrow 326, and may output incident p-polarized image light 22 within a second beam, as shown by arrow 328. Upon exiting birefringent crystal 322, the second beam (e.g., the p-polarized image light 22) may be separated from the first beam (e.g., the s-polarized image light 22) by displacement 330. The magnitude of displacement 330 may be directly proportional to the length 322 of birefringent crystal 322, for example.

The p-polarized image light 22 may be spatially offset from the s-polarized image light 22 upon in-coupling to waveguide 26 by input coupler 28 (e.g., by displacement 330). The images conveyed by the s-polarized image light 22 may therefore be spatially offset (e.g., by displacement 330) from the images conveyed by the p-polarized image light 22 at eye box 24. Control circuitry 16 may rapidly toggle TN cell between the first and second states to alternate between providing input coupler 28 with p-polarized image light 22 and s-polarized image light 22. Length 332 and thus displacement 330 may be selected so that, when the state of TN cell 320 is toggled more rapidly than the response rate of the human eye (e.g., 24 Hz or faster, 60 Hz or faster, 120 Hz or faster, 240 Hz or faster, etc.), the resulting images provided at eye box 24 exhibit an effective resolution that is greater than the resolution of that would otherwise be conveyed to eye box 24 in the absence of TN cell 320 and birefringent crystal 322. TN cell 320 and birefringent crystal 322 of FIG. 24 may sometimes be referred to collectively herein as spatial pixel shifting structures 325.

The example of FIG. 24 in which display 14 performs spatial pixel shifting operations is merely illustrative. In another suitable arrangement, display 14 may perform angular pixel shifting operations to maximize the effective resolution of images provided to eye box 24.

Figure 25:
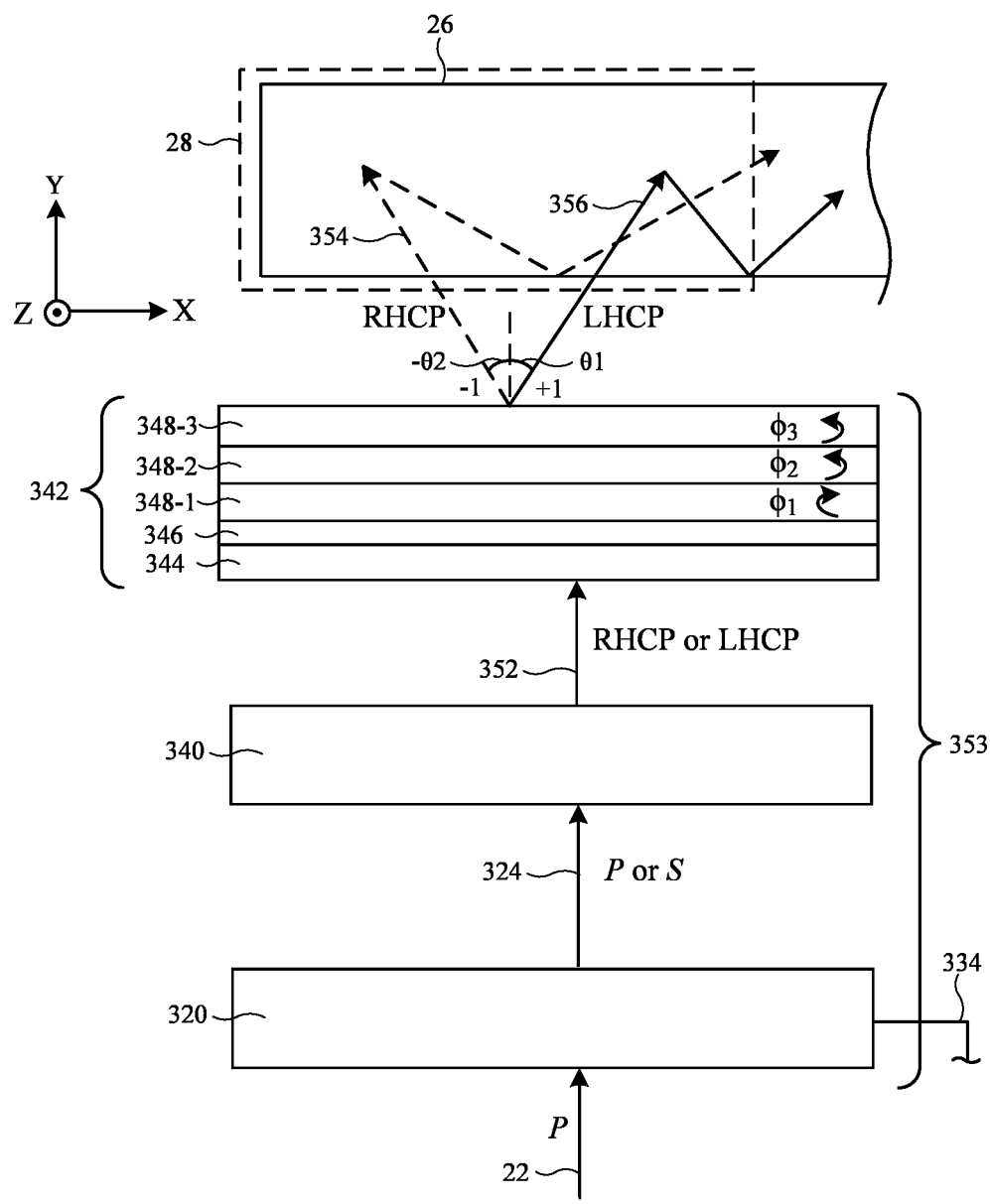
FIG. 25 is a top view of an illustrative display having angular pixel shifting structures that increase the effective resolution of images provided at an eye box in accordance with some embodiments.

FIG. 25 is a top-down view showing how display 14 may perform angular pixel shifting operations to maximize the effective resolution of images provided to eye box 24. As shown in FIG. 25, birefringent crystal 322 of FIG. 24 may be replaced by quarter waveplate 340 and geometric phase grating (GPG) 342. Quarter waveplate 340 may be optically interposed between TN cell 320 and GPG 342. GPG 342 may be optically interposed between quarter waveplate 340 and input coupler 28.

Collimating lens 34 (FIG. 2) may be optically interposed between GPG 342 and input coupler 28, may be optically interposed between quarter waveplate 340 and GPG 342, may be optically interposed between quarter waveplate 340 and TN cell 320, or may be optically interposed between fLCOS display panel 40 and TN cell 320. An arrangement in which collimating lens 34 is optically interposed between quarter waveplate 340 and GPG 342 is described herein as an example. In this example, the collimating lens may serve to focus the pupil of image light 22 onto GPG 342 (e.g., GPG 342 may be located external to display module 14A and at or adjacent input coupler 28 and the entrance pupil of waveguide 26), whereas quarter waveplate 340 and TN cell 320 are located within display module 14A.

Quarter waveplate 340 may convert p-polarized image light 22 (e.g., as provided by TN cell 320 when TN cell 320 is in the first state) into RHCP light that is provided to GPG 342, as shown by arrow 352. Quarter waveplate 340 may convert s-polarized image light 22 (e.g., as provided by TN cell 320 when TN cell 320 is in the second state) into LHCP light that is provided to GPG 342, as shown by arrow 352.

GPG 342 may diffract incident image light 22 received from quarter waveplate 340 onto a corresponding output angle θ (e.g., measured relative to the optical axis or the Y-axis as shown in FIG. 25). GPG 342 may have different diffraction orders that diffract incident image light 22 in different directions based on the polarization of the incident image light. For example, GPG 342 may have a first diffraction order (e.g., a +1 diffraction order) that diffracts incident LHCP image light 22 onto output angle θ1, as shown by arrow 356. GPG 342 may also have a second diffraction order (e.g., a −1 diffraction order) that diffracts incident RHCP image light 22 onto output angle-θ2, as shown by arrow 352. Output angle-θ2 may be equal and opposite output angle θ1 or may be any other desired output angle. The output angles of arrows 354 and 356 may both be oriented on the same side of the optical axis if desired.

In one suitable arrangement that is sometimes described herein as an example, GPG 342 may include a substrate 344 and an alignment layer 346 layered onto substrate 344. GPG 342 may include multiple liquid crystal (LC) layers 348 (e.g., a first LC layer 348-1, a second LC layer 348-2, and a third LC layer 348-3) layered onto alignment layer 346. Alignment layer 346 may serve to align the LC molecules in LC layers 348 at substrate 344 (e.g., with a corresponding grating period). Each LC layer 348 may have a corresponding twist angle φ (e.g., LC layer 348-1 may have a first twist angle $φ_1$, LC layer 348-2 may have a second twist angle or oriented opposite twist angle $φ_1$, and LC layer 348-3 may have a third twist angle $φ_3$ oriented opposite twist angle $φ_1$).

In this way, the LHCP image light 22 may be angularly offset from the RHCP image light 22 upon in-coupling to waveguide 26 by input coupler 28 (e.g., by an angular displacement having a magnitude equal to |θ1|+|θ2|). The images conveyed by the LHCP image light 22 may therefore be angularly offset from the images conveyed by the RHCP image light 22 at eye box 24. Control circuitry 16 may rapidly toggle TN cell between the first and second states to alternate between providing input coupler 28 GPG 342 and thus input coupler 28 with LHCP image light 22 and RHCP image light 22. GPG 342 may be configured to output image light 22 at angles θ1 and θ2 that are selected so that, when the state of TN cell 320 is toggled more rapidly than the response rate of the human eye, the resulting images provided at eye box 24 exhibit an effective resolution that is greater than the resolution of the images that would otherwise be conveyed to eye box 24 in the absence of TN cell 320, quarter waveplate 340, and GPG 342. TN cell 320, quarter waveplate 340, and GPG 342 of FIG. 25 may sometimes be referred to collectively herein as angular pixel shifting structures 353. Spatial pixel shifting structures 325 of FIG. 24 and angular pixel shifting structures 353 may sometimes be referred to collectively herein as pixel shifting structures for display 14.

Figure 26:
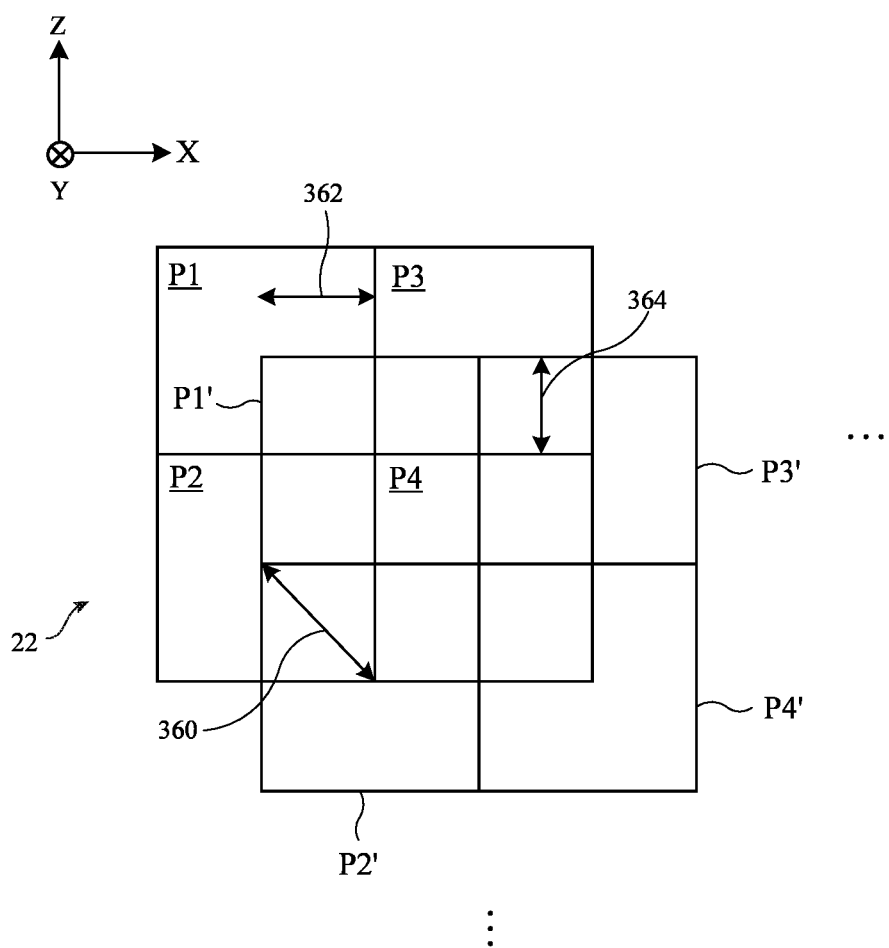
FIG. 26 is a front view of pixels of image light that illustrates how illustrative pixel shifting structures the types shown in FIGS. 24 and 25 may increase the effective resolution of the image light in accordance with some embodiments.

FIG. 26 is a front view showing how the pixel shifting structures in display 14 may provide image light 22 with an increased effective resolution at eye box 24 (e.g., as viewed at eye box 24 in the +Y direction of FIG. 2). In the example of FIG. 26, four pixels of image light 22 are shown for the sake of clarity. In general, image light 22 and the display module may include any desired number of pixels.

As shown in FIG. 26, image light 22 may include pixels P1, P2, P3, and P4 when TN cell 320 of FIGS. 24 and 25 is in the first state (e.g., when TN cell 320 outputs p-polarized light). When TN cell 320 is in the second state (e.g., when TN cell 320 outputs s-polarized light), pixels P1, P2, P3, and P4 may be displaced by displacement 360, as shown by respective pixels P1', P2', P3', and P4'. Displacement 360 may, for example, be a two-dimensional displacement that includes offset 364 parallel to the Z-axis and/or offset 362 parallel to the X-axis. Displacement 360 may be produced by a spatial displacement such as displacement 330 of FIG. 24 (e.g., in scenarios where the pixel shifting structures include spatial pixel shifting structures 325) or by an angular displacement such as an angular displacement having a magnitude equal to |θ1|+|θ2| of FIG. 25 (e.g., in scenarios where the pixel shifting structures include angular pixel shifting structures 353).

Pixels P1, P2, P3, and P4 may exhibit a first pixel pitch and pixels P1', P2', P3', and P4' may also exhibit the first pixel pitch. However, the combination of pixels P1, P2, P3, and P4 with pixels P1', P2', P3', and P4' may exhibit a second pixel pitch that is less than (e.g., half) the first pixel pitch. By rapidly toggling between the first and second states of TN cell 320, image light 22 may effectively include each of pixels P1, P2, P3, P4, P1', P2', P3', and P4' (e.g., as perceived by a user at eye box 24) and thus the second pixel pitch, rather than only pixels P1, P2, P3, and P4 and the first pixel pitch (e.g., in scenarios where pixel shifting structures are omitted from display 14). This may serve to increase the effective resolution of image light 22 relative to scenarios where the pixel shifting structures are omitted (e.g., to twice the resolution that image light 22 would otherwise have in the absence of the pixel shifting structures), without requiring an increase in size or processing resources for display module 14A.

Figure 27:
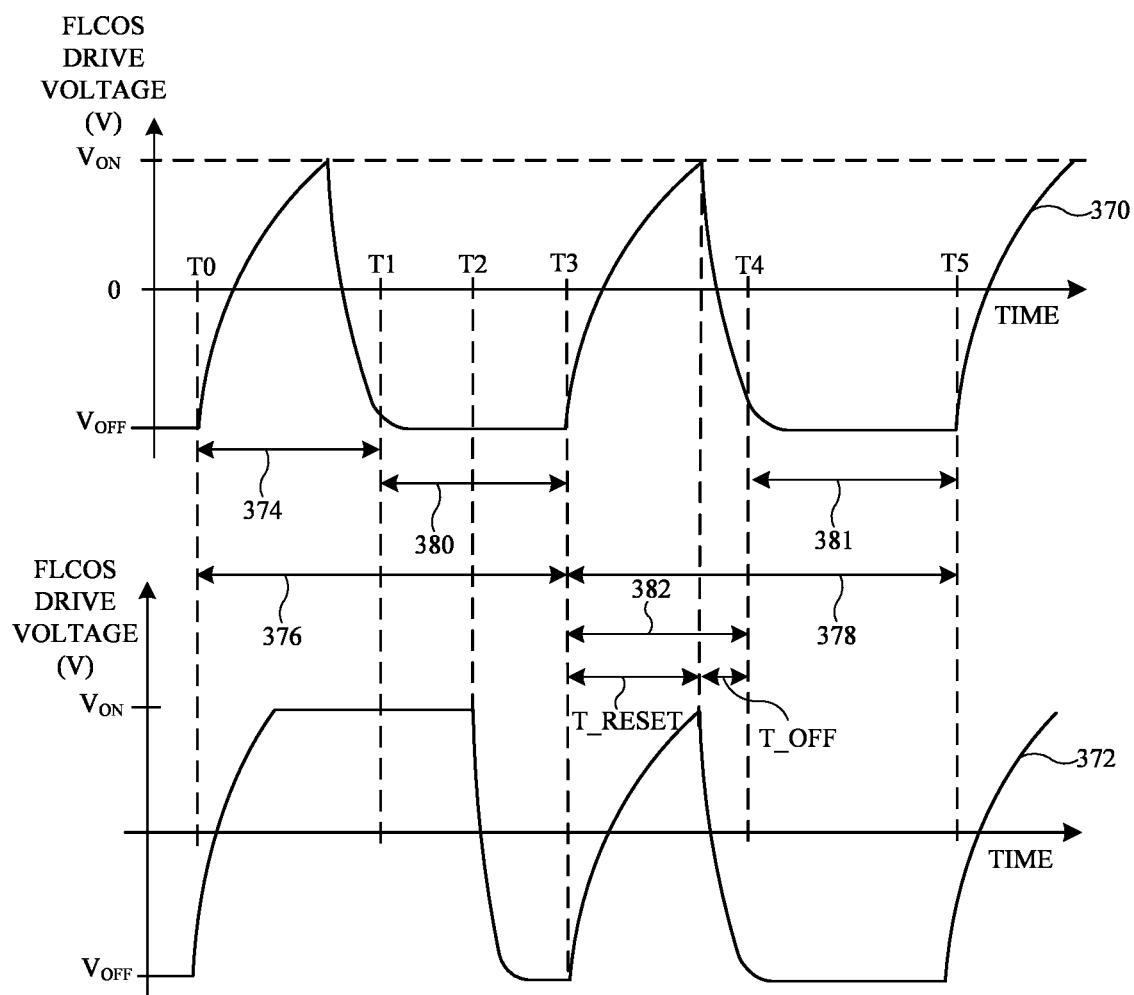
FIG. 27 is a timing diagram of illustrative driving voltages that may be used to drive an fLCOS display panel in accordance with some embodiments.

Control circuitry 16 (FIG. 2) may drive image data onto fLCOS display panel 40 using fLCOS drive voltage waveforms (e.g., based on control signals provided to fLCOS display panel 40 over control path(s) 44 of FIG. 2). FIG. 27 is a timing diagram of two illustrative fLCOS drive voltage waveforms that may be used to drive fLCOS display panel 40.

As shown in FIG. 27, fLCOS drive voltage waveform (curve) 370 plots the fLCOS drive voltage as a function of time for producing image light 22 with a gray level of zero. fLCOS drive voltage waveform (curve) 372 plots the fLCOS drive voltage as a function of time for producing image light 22 with a gray level of 128 (e.g., in a 256-bit field). The fLCOS drive voltage may vary between a first drive voltage VOFF (e.g., a negative voltage level) and a second drive voltage VON (e.g., a positive voltage level).

Waveforms 370 and 372 may be at first drive voltage VOFF prior to time TO. At time TO, waveform 370 may begin to increase to a peak at second drive voltage VON. Waveform 370 may return to first drive voltage VOFF at time T1. The time period between times TO and T1 may sometimes be referred to herein as dark gap 374. Dark gap 374 may be used to reset fLCOS display panel 40, for example.

The time period between times T1 and T3 may form a duty period 380 during which at least one light source 48 (e.g., red light source 48A of FIG. 3) may be turned on to provide illumination light 38 to fLCOS display panel 40. Because waveform 370 is at first drive voltage VOFF during duty period 380, the fLCOS display panel may not produce image light during duty period 380 when driven using waveform 370. The time period between times TO and T3 may sometimes be referred to as field period 376. Field period 376 may be associated with the illumination of fLCOS display panel 40 by a corresponding field of illumination light (e.g., illumination light of a particular color) and may include the reset time (e.g., a portion of dark gap 374) required to reset the fLCOS display panel to begin reflecting the field of illumination light as image light 22.

At time T3, waveform 370 may to increase to a peak at second drive voltage VON. Waveform 370 may return to first drive voltage VOFF at time T4. The time period between times T3 and T4 may sometimes be referred to herein as the dark gap 382. The time period between time T3 and the time when waveform 370 reaches second drive voltage Von may sometimes be referred to herein as reset time T_RESET. Reset time T_RESET may allow time for fLCOS display panel 40 to reset for the next field of the image. The time period between the time when waveform 370 reaches second drive voltage VON and time T4 may sometimes be referred to herein as off time T_OFF. The duration of dark gap 374 (e.g., off time T_OFF) may be adjusted to control the overall power consumption of display module 14A.

The time period between times T4 and T5 may form a duty period 381 during which a light source other than the light source activated during duty period 380 may be turned on to provide illumination light 38 to fLCOS display panel 40. A subsequent dark gap may begin at time T5, as waveform 370 increases back to second drive voltage VON. This cycle may continue for each of the fields in the image frame to be displayed. The time period between times T4 and T5 may sometimes be referred to as field period 378.

As shown in FIG. 27, waveform 372 may remain at second drive voltage VON after time TO and until time T2. By driving fLCOS display panel 40 at second drive voltage VON during a portion of duty period 380 (e.g., between times T1 and T2), fLCOS display panel 40 may reflect some of the illumination light 38 incident during duty period 380 (as image light 22). This may allow fLCOS display panel 40 to produce image light 22 at a higher gray level when driven by waveform 372 than when driven by waveform 370, for example.

The example of FIG. 27 is merely illustrative. In general, any desired fLCOS drive voltage waveforms may be used to drive fLCOS display panel 40 to produce any desired pixel values of any desired colors in image light 22. If desired, the optical performance of fLCOS display panel 40 may be optimized by overdriving or underdriving the fLCOS drive voltage provided to fLCOS display panel 40. The example of FIG. 27 in which the drive voltage waveform follows a reset-based driving scheme is merely illustrative. In another suitable arrangement, a reset-less driving scheme may be used (e.g., there may not be dark gaps between each of the color fields and, if desired, an inverse waveform pattern may be used after each waveform pattern for charge balancing).

Figure 28:
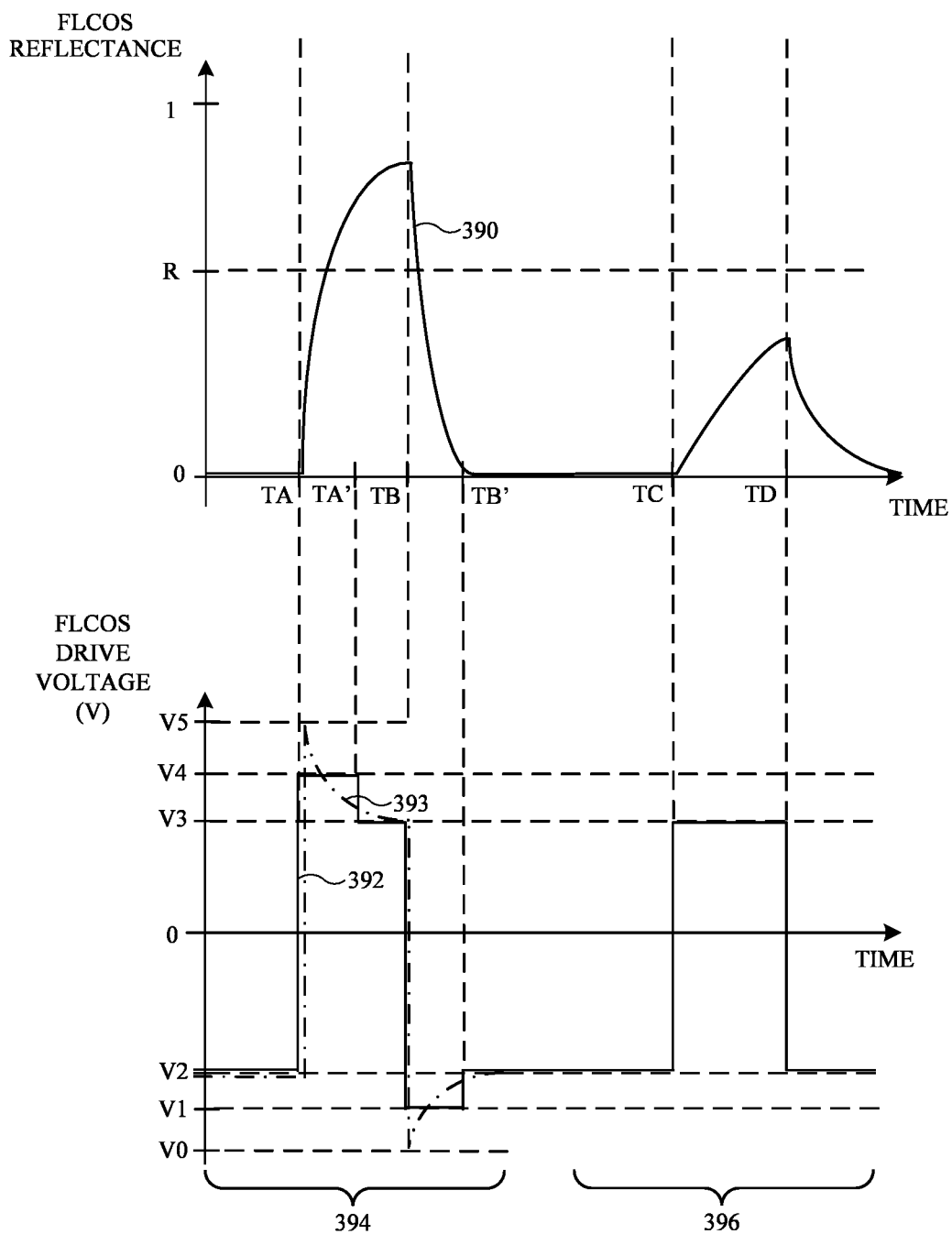
FIG. 28 is a timing diagram showing how an illustrative fLCOS display panel may be overdriven by a non-square wave driving voltage waveform in accordance with some embodiments.

FIG. 28 is a timing diagram showing one example of how fLCOS display panel 40 may be overdriven to optimize optical performance. As shown in FIG. 28, fLCOS display panel 40 may be driven using fLCOS drive voltage waveform (curve) 392. Curve 390 of FIG. 28 plots the corresponding reflectance of fLCOS display panel 40 when driven using fLCOS drive voltage waveform 392.

In the example of FIG. 28, fLCOS drive voltage waveform 392 has four possible voltage levels (e.g., a first drive voltage level V1, a second drive voltage level V2, a third drive voltage level V3, and a fourth drive voltage level V4). First drive voltage level V1 may be less than second drive voltage level V2, second drive voltage level V2 may be less than a voltage level of zero, third drive voltage level V3 may be greater than a voltage level of zero, and fourth drive voltage level V4 may be greater than third drive voltage level V4. This example is merely illustrative. In general, fLCOS drive voltage waveform 392 may have any desired number of possible voltage levels of any desired magnitudes. In one suitable arrangement that is sometimes described herein as an example, first drive voltage level V1 may be −1.8V, second drive voltage level V2 may be −1.5V, third drive voltage level V3 may be 1.5V, and fourth drive voltage level V4 may be 1.8V. Other drive voltage levels may be used if desired.

As shown by fLCOS drive voltage waveform 392, when fLCOS display panel 40 is not being overdriven, fLCOS drive voltage waveform 392 may include square wave pulses such as square wave pulse 396 (e.g., where the fLCOS drive voltage rises from second voltage level V2 to third voltage level V3 at time TC and falls back to second voltage level V2 at time TD). Square wave pulse 396 may produce a corresponding spike in the reflectance of fLCOS display panel 40 from a reflectance of zero to a reflectance of R (e.g., a value greater than 0 and less than 1.0), as shown by curve 390.

In order to overdrive fLCOS display panel 40, control circuitry 16 may drive fLCOS display panel 40 using a non-square wave fLCOS drive voltage waveform, such as an fLCOS drive voltage waveform that includes non-square wave pulses such as non-square wave pulse 394 of fLCOS drive voltage waveform 392. For example, at time TA, fLCOS drive voltage waveform 392 may increase from second voltage level V2 to fourth voltage level V4 (sometimes referred to herein as overdrive voltage level V4). If desired, at time TA', fLCOS drive voltage waveform 392 may decrease to third voltage level V3. At time TB, fLCOS drive voltage waveform 392 may decrease to first voltage level V1. At time TB', fLCOS drive voltage waveform 392 may increase back to second voltage level V2.

Non-square wave pulse 394 of fLCOS drive voltage waveform 392 may produce a corresponding spike in the reflectance of fLCOS display panel 40 from a reflectance of zero at time TA to a reflectance greater than reflectance R at or near time TA' (e.g., a reflectance at or near 1.0). In other words, overdriving fLCOS display panel 40 in this way may serve to increase the reflectance of fLCOS display panel 40 relative to scenarios where fLCOS display panel 40 is not overdriven, thereby maximizing the overall optical efficiency of display module 14A in producing image light 22.

The example of FIG. 28 is merely illustrative. In practice, curve 392 and non-square wave pulse 394 may have other shapes. In general, fLCOS display panel 40 may be overdriven using any desired non-square wave fLCOS drive voltage waveform (e.g., a waveform having non-square wave pulses that reach an overdrive voltage level such as fourth voltage level V4). Another example of a non-square wave pulse 394 that may be used to overdrive fLCOS display panel 40 is shown by dashed curve 393 of FIG. 28. In this example, the fLCOS drive voltage rises to voltage level V5 at time TA, drops continuously to voltage level V3 between times TA and TB, drops to voltage level V0 at time TB, and rises continuously to voltage level V2 between times TB and TB'. Voltage level V5 may be greater than 1.8V (e.g., 2.0V) and voltage level V0 may be less than −1.8V (e.g., −2.0V), as one example. The precise shape of curve 393 between times TA and TB and between times TB and TB' may, for example, be altered to optimize the performance of fLCOS display panel 40. The example of FIG. 28 in which fLCOS display panel 40 is overdriven is merely illustrative and, if desired, fLCOS display panel 40 may be underdriven. Different non-square wave fLCOS drive voltage waveforms may be used to drive fLCOS display panel 40 at different times (e.g., depending on the operating conditions of display 14).

Figure 29:
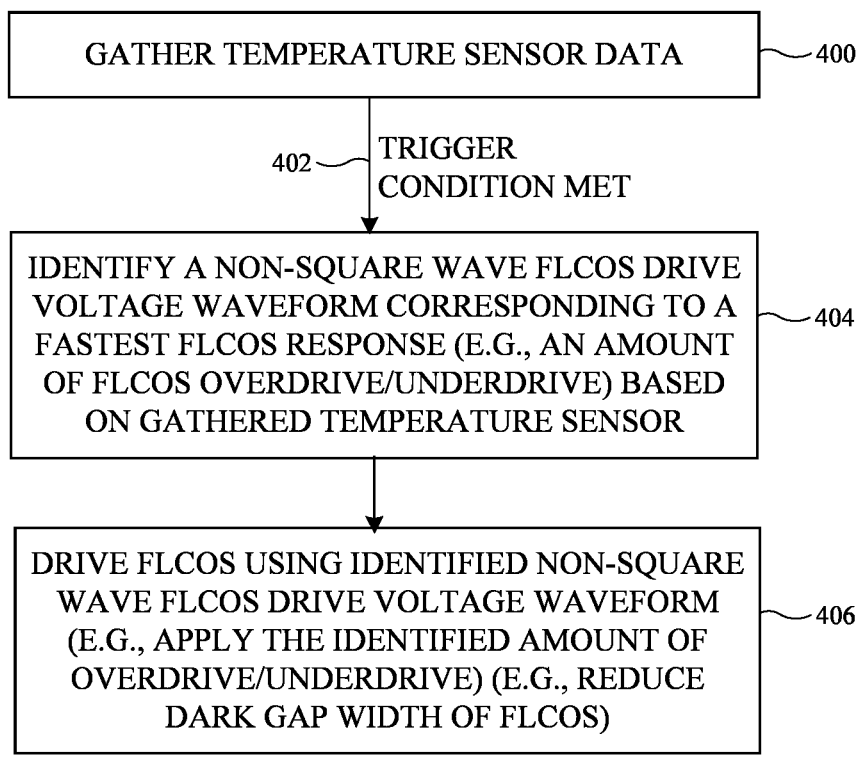
FIG. 29 is a flow chart of illustrative steps that may be involved in overdriving an fLCOS display panel based on temperature sensor measurements in accordance with some embodiments.

In practice, the optimal overdrive or underdrive waveform for fLCOS display panel 40 may vary as the operating temperature of fLCOS display panel 40 changes over time. If desired, control circuitry 16 may overdrive or underdrive fLCOS display panel 40 based on the temperature of display 14 (e.g., the temperature of fLCOS display panel 40). FIG. 29 is a flow chart of illustrative steps that may be performed by control circuitry 16 (FIG. 2) in overdriving or underdriving fLCOS display panel 40 based on the temperature of display 14.

At step 400, control circuitry 16 may gather temperature sensor data using one or more temperature sensors 19 in system 10 (FIG. 1). If desired, control circuitry 16 may estimate the temperature of fLCOS display panel 40 based on the gathered temperature sensor data (e.g., using a temperature model for system 10). In scenarios where multiple temperature sensors 19 are used to gather temperature sensor data, the temperature sensors may be placed at different locations across system 10 if desired. Control circuitry 16 may also determine whether a trigger condition has been met before proceeding.

The trigger condition may be a predetermined change in the gathered temperature sensor data, may occur when the gathered temperature data reaches a threshold temperature level, may be based on the content of the image(s) to be displayed using fLCOS display panel 40, may be based on a software call issued by one or more programs running on system 10, may be based on a user input provided by a user of system 10, etc. Once the trigger condition has been met, processing may proceed to step 404 as shown by arrow 402.

At step 404, control circuitry 16 may identify a non-square wave fLCOS drive voltage waveform with which to overdrive or underdrive fLCOS display panel 40 based on the gathered temperature sensor data. For example, control circuitry 16 may identify a non-square wave fLCOS drive voltage waveform that optimizes the optical performance (e.g., reflectance) of fLCOS display panel 40 for its current temperature (e.g., as determined while processing step 400). If desired, control circuitry 16 may store predetermined (optimal) non-square wave fLCOS drive voltage waveforms for different temperature values of fLCOS display panel 40 (e.g., in a look-up table or other data structure) and may identify the stored non-square wave fLCOS drive voltage waveform corresponding to the current (e.g., estimated) temperature of fLCOS display panel 40. The stored non-square wave fLCOS drive voltage waveforms may be determined during the design, manufacture, assembly, testing, and/or calibration of system 10 if desired.

At step 406, control circuitry 16 may drive fLCOS display panel 40 using the non-square wave drive voltage waveform identified while processing step 404. Driving fLCOS display panel 40 in this way may maximize the reflectance of fLCOS display panel 40 for the current operating temperature of the display panel, for example. Control circuitry 16 may continue to overdrive fLCOS display panel 40 for a predetermined time period, until a new trigger condition is detected, for a predetermined number of frames, etc.

Figure 30:
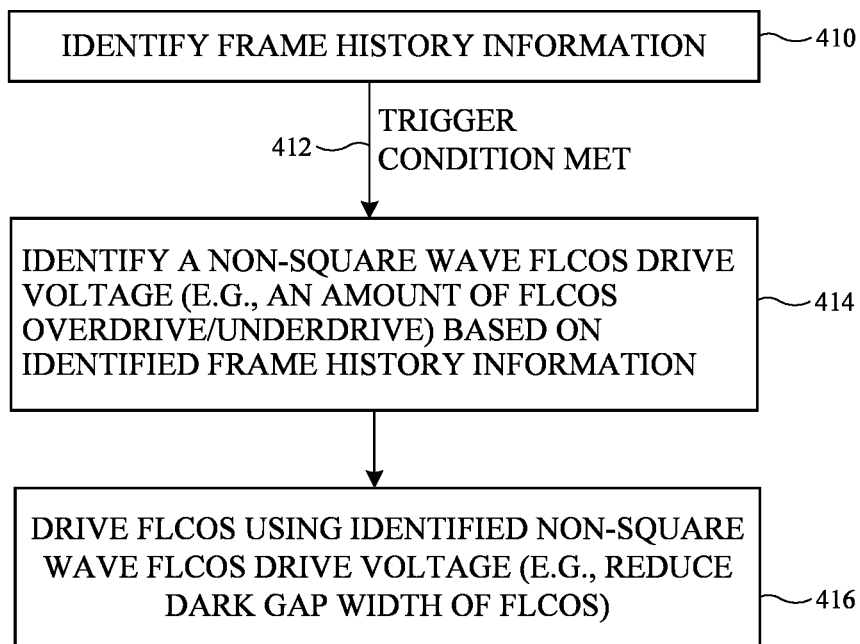
FIG. 30 is a flow chart of illustrative steps that may be involved in overdriving an fLCOS display panel based on frame history information in accordance with some embodiments.

The example of FIG. 29 in which control circuitry 16 overdrives fLCOS display panel 40 based on the temperature of display 14 is merely illustrative. In another suitable arrangement, control circuitry 16 may overdrive or underdrive fLCOS display panel 40 based on frame history information. FIG. 30 is a flow chart of illustrative steps that may be performed by control circuitry 16 (FIG. 2) in overdriving or underdriving fLCOS display panel 40 based on frame history information.

At step 410, control circuitry 16 may identify frame history information for fLCOS display panel 40. The frame history information may include, for example, information about the image frames that have been previously displayed using fLCOS display panel 40. Control circuitry 16 may also determine whether a trigger condition has been met before proceeding.

The trigger condition may be a predetermined change in the gathered temperature sensor data, may occur when the gathered temperature data reaches a threshold temperature level, may be based on the content of the image(s) to be displayed using fLCOS display panel 40, may be based on a software call issued by one or more programs running on system 10, may be based on a user input provided by a user of system 10, etc. In one suitable arrangement that is described herein as an example, the trigger condition may occur when the previous image frame displayed was fully on or fully off. Once the trigger condition has been met, processing may proceed to step 414 as shown by arrow 412.

At step 414, control circuitry 16 may identify a non-square wave fLCOS drive voltage waveform with which to overdrive or underdrive fLCOS display panel 40 based on the identified frame history information. For example, control circuitry 16 may identify a non-square wave fLCOS drive voltage waveform that optimizes the optical performance (e.g., reflectance) of fLCOS display panel 40 depending on the immediately previous image frame(s) displayed by fLCOS display panel 40 (e.g., a first fLCOS drive voltage waveform when the previous image frame was fully on, a second fLCOS drive voltage waveform when the previous image frame was fully off, etc.).

At step 416, control circuitry 16 may drive fLCOS display panel 40 using the non-square wave drive voltage waveform identified while processing step 414. Driving fLCOS display panel 40 in this way may maximize the reflectance of fLCOS display panel 40 for the current operating temperature of the display panel, for example. Control circuitry 16 may continue to overdrive fLCOS display panel 40 for a predetermined time period, until a new trigger condition is detected, for a predetermined number of frames, etc.

Overdriving fLCOS display panel 40 (e.g., using non-square wave fLCOS drive voltage waveforms as identified while processing step 404 of FIG. 29 or step 414 of FIG. 30) may, for example, serve to reduce the duration (width) of the dark gap of fLCOS display panel 40 relative to scenarios where fLCOS display panel 40 is driven using a square wave fLCOS drive voltage waveform. This may serve to further optimize power consumption in display module 14A, for example. Control circuitry 16 may therefore sometimes be referred to herein as reducing the duration of the dark gap of fLCOS display panel 40 based on gathered temperature sensor data or identified frame history information. The arrangement of FIG. 30 may be combined with the arrangement of FIG. 29 if desired (e.g., control circuitry 16 may identify a non-square wave fLCOS drive voltage that optimizes the optical performance of fLCOS display panel 40 given both the current temperature of fLCOS display panel 40 and the frame history information of fLCOS display panel 40). If desired, the non-square wave drive voltage waveform to use may be selected based on the previous frame's target reflectance state and temperature information. For example, a look up table may modify the non-square wave drive voltage waveform for the current frame based on any previous state. As one example, if the previous frame was on for one-half the illumination field time, it would have a different non-square wave drive voltage for the current frame when the previous frame was on for 98% of the illumination field time. In driving fLCOS panel 40, the percent on (duty cycle) during the illumination time may be selected to control the grey level for the field.

Figure 31:
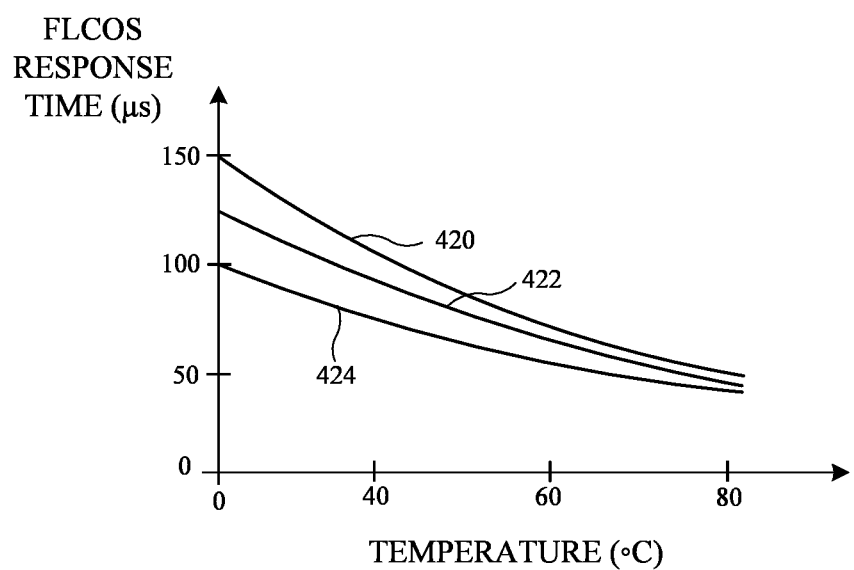
FIG. 31 is a plot of fLCOS performance (response time as a function of temperature) that shows how overdriving an fLCOS display panel based on temperature sensor measurements may minimize fLCOS response time in accordance with some embodiments.

Overdriving fLCOS display panel 40 may also serve to optimize the optical performance of display module 14A by reducing the response time of fLCOS display panel 40. FIG. 31 is a plot showing how overdriving fLCOS display panel 40 may reduce the response time of fLCOS display panel 40 across a wide range of operating temperatures.

In the example of FIG. 31, the horizontal axis plots the temperature of fLCOS display panel 40 (e.g., in degrees Celsius) and the vertical axis plots the response time of fLCOS display panel 40 (e.g., in microseconds). Curve 420 plots the response time of fLCOS display panel 40 when driven using square-wave fLCOS drive voltage pulses (e.g., pulses such as pulse 396 of FIG. 28). As shown by curve 420, the response time of fLCOS display panel 40 may decrease as temperature increases.

Curve 422 plots the response time of fLCOS display panel 40 when (over) driven using non-square-wave fLCOS drive voltage waveform pulses having a first peak voltage level (e.g., pulses such as pulse 394 of FIG. 28 having a peak voltage given by fourth voltage level V4). Curve 424 plots the response time of fLCOS display panel 40 when (over) driven using a non-square-wave fLCOS drive voltage waveform pulses having a second peak voltage level that is higher than the first peak voltage level. The peak voltage level of the square-wave fLCOS drive voltage pulses associated with curve 420 may be 1.5V, the first peak voltage level associated with curve 422 may be 1.65V, and the second peak voltage level associated with curve 424 may be 1.8V, as one example. In general, the first peak voltage level may be any desired voltage greater than 1.5V (e.g., in scenarios where VON of FIG. 27 is 1.5V), greater than 1.6V, greater than 1.7V, greater than 1.8V, etc.

As shown by curves 422 and 424, overdriving fLCOS display panel 40 may serve to reduce the response time of fLCOS display panel 40 across all temperatures. As shown by curve 424, overdriving fLCOS display panel 40 with a non-square wave fLCOS drive voltage waveform having a greater peak voltage level may serve to further decrease the response time of fLCOS display panel 40. In this way, overdriving fLCOS display panel 40 may serve to further optimize the optical performance of display module 14A by reducing the response time of fLCOS display panel 40 across a wide range of operating temperatures. The example of FIG. 31 is merely illustrative. In practice, curves 420, 422, and 424 may have other shapes.

In accordance with an embodiment, a display system is provided that includes illumination optics that produce linear polarized illumination light, the illumination optics include: a light emitter configured to emit unpolarized light, and polarization recycling structures configured to receive the unpolarized light and configured to output the linear polarized illumination light based on the unpolarized light; a ferroelectric liquid crystal on silicon (fLCOS) panel configured to produce image light by modulating the linear polarized illumination light using image data; and a waveguide configured to propagate the image light.

In accordance with another embodiment, the polarization recycling structures include a reflective polarizer.

In accordance with another embodiment, the polarization recycling structures include a quarter wave plate optically interposed between the reflective polarizer and the light emitter.

In accordance with another embodiment, the reflective polarizer includes a wire grid polarizer.

In accordance with another embodiment, the light emitter includes a light emitting diode (LED) die on a reflector and contact layer and the illumination optics include a patterned silicon substrate on the LED die, the wire grid polarizer being at least partially separated from the patterned silicon substrate by an air gap.

In accordance with another embodiment, the reflective polarizer includes a reflective polarizer film.

In accordance with another embodiment, the light emitter includes a light emitting diode (LED) die on a reflector and contact layer and the illumination optics include a patterned silicon substrate on the LED die, the reflective polarizer film being separated from the patterned silicon substrate by an air gap.

In accordance with another embodiment, the illumination optics include a glass layer overlapping the LED die and the reflective polarizer film is coupled to the glass layer using adhesive.

In accordance with another embodiment, the LED die is mounted to a ceramic substrate and the illumination optics include a spacer that couples the ceramic substrate to the glass layer.

In accordance with another embodiment, the illumination optics include an additional light emitter configured to emit unpolarized light and the polarization recycling structures receive light from both the light emitter and the additional light emitter.

In accordance with another embodiment, the illumination optics include a sapphire substrate overlapping both the light emitter and the additional light emitter and the illumination optics include a spacer that separates the polarization recycling structures from the sapphire substrate by an air gap.

In accordance with another embodiment, the illumination optics include a condenser lens and the polarization recycling structures are optically interposed between the condenser lens and the light emitter.

In accordance with another embodiment, the polarization recycling structures are layered on a planar surface of the condenser lens.

In accordance with an embodiment, a display system is provided that includes a prism configured to output illumination light; a first light source that includes a first light emitting diode (LED) die configured to emit unpolarized light of a first color and that includes first polarization recycling structures optically interposed between the first LED die and the prism, the first polarization recycling structures are configured to output linearly polarized light of the first color; a second light source that includes a second LED die configured to emit unpolarized light of a second color and that includes second polarization recycling structures optically interposed between the second LED die and the prism, the second polarization recycling structures are configured to output linearly polarized light of the second color and the prism includes: a first partial reflector configured to reflect the linearly polarized light of the first color, and a second partial reflector configured to reflect the linearly polarized light of the second color, the illumination light includes the linearly polarized light of the first color and the linearly polarized light of the second color.

In accordance with another embodiment, the first partial reflector includes a first material interface that configures the first partial reflector to reflect the linearly polarized light of the first color while transmitting light of the second color, the second partial reflector includes a second material interface that configures the second partial reflector to reflect the linearly polarized light of the second color while transmitting light of the first color, the display system includes a third light source that includes a third LED die configured to emit unpolarized light of a third color that is different from the first and second colors, and the first and second partial reflectors are configured to transmit light of the third color.

In accordance with another embodiment, the first polarization recycling structures include a first reflective polarizer and the second polarization recycling structures include a second reflective polarizer.

In accordance with another embodiment, the first polarization recycling structures include a first quarter waveplate optically interposed between the first reflective polarizer and the first LED die and the second polarization recycling structures include a second quarter waveplate optically interposed between the second reflective polarizer and the second LED die.

In accordance with another embodiment, the display system includes a ferroelectric liquid crystal on silicon (fLCOS) display panel configured to reflect the illumination light as image light; and a waveguide configured to propagate the image light.

In accordance with an embodiment, a display system is provided that includes a light emitting diode (LED) die configured to emit unpolarized light; a reflective polarizer configured to transmit a first linear polarization of the unpolarized light and configured to reflect a second linear polarization of the unpolarized light back towards the LED die; a quarter waveplate optically interposed between the reflective polarizer and the LED die; and a ferroelectric liquid crystal on silicon (fLCOS) panel configured to produce image light based on the first linear polarization of the unpolarized light transmitted by the reflective polarizer.

In accordance with another embodiment, the display system includes a waveguide configured to propagate the image light via total internal reflection.

The foregoing is merely illustrative and various modifications can be made to the described embodiments. The foregoing embodiments may be implemented individually or in any combination.

What is claimed is:
1. A display system comprising:
illumination optics that produce linear polarized illumination light, wherein the illumination optics comprise:
a light emitter configured to emit unpolarized light, wherein the light emitter comprises a light emitting diode (LED) chip and wherein the LED chip comprises an LED die on a reflector and contact layer,
polarization recycling structures configured to receive the unpolarized light and configured to output the linear polarized illumination light based on the unpolarized light, wherein the polarization recycling structures comprise a reflective polarizer film,
a patterned silicon substrate on the LED die, wherein the reflective polarizer film is separated from the patterned silicon substrate by an air gap,
a glass layer overlapping the LED die, wherein the reflective polarizer film is coupled to the glass layer using adhesive,
a ceramic substrate, wherein the LED chip is mounted to the ceramic substrate, and
a spacer that couples the ceramic substrate to the glass layer;
a ferroelectric liquid crystal on silicon (fLCOS) panel configured to produce image light by modulating the linear polarized illumination light using image data; and
a waveguide configured to propagate the image light.

2. The display system of claim 1, wherein the illumination optics further comprise an anti-reflective layer on the glass layer.

3. The display system of claim 1, wherein the polarization recycling structures further comprise a quarter wave plate optically interposed between the reflective polarizer film and the light emitter.

4. The display system of claim 1, wherein the illumination optics further comprise a sealant that surrounds a lateral periphery of the reflective polarizer film.

5. The display system of claim 1, wherein the illumination optics further comprise an additional light emitter configured to emit additional unpolarized light and wherein the polarization recycling structures receive the unpolarized light from the light emitter and the additional unpolarized light from the additional light emitter.

6. The display system of claim 1, wherein the illumination optics further comprise a condenser lens and wherein the polarization recycling structures are optically interposed between the condenser lens and the light emitter.

7. The display system of claim 6, wherein the polarization recycling structures are layered on a planar surface of the condenser lens.

8. The display system of claim 7, wherein the polarization recycling structures cover an entirety of the planar surface of the condenser lens.

9. The display system of claim 7, wherein the polarization recycling structures cover only a portion of the planar surface of the condenser lens.

10. A display system comprising:
illumination optics that produce linear polarized illumination light, wherein the illumination optics comprise:
first and second light emitters configured to emit unpolarized light,
polarization recycling structures configured to receive the unpolarized light from the first and second light emitters and configured to output the linear polarized illumination light based on the unpolarized light,
a sapphire substrate overlapping the first and second light emitters, and a spacer that separates the polarization recycling structures from the sapphire substrate by an air gap;
a ferroelectric liquid crystal on silicon (fLCOS) panel configured to produce image light by modulating the linear polarized illumination light using image data; and
a waveguide configured to propagate the image light.

11. The display system of claim 10, wherein the polarization recycling structures comprise a reflective polarizer.

12. The display system of claim 11, wherein the reflective polarizer comprises a wire grid polarizer.

13. The display system of claim 11, wherein the reflective polarizer comprises a reflective polarizer film.

14. The display system of claim 10, wherein the illumination optics further comprise a silicon substrate and wherein the first and second light emitters are mounted to the silicon substrate.

* * * * *